United States Patent
Doyle

(10) Patent No.: US 7,103,542 B2
(45) Date of Patent: Sep. 5, 2006

(54) AUTOMATICALLY IMPROVING A VOICE RECOGNITION SYSTEM

(75) Inventor: Sean Doyle, Mountain View, CA (US)

(73) Assignee: Ben Franklin Patent Holding LLC, Los Altos, CA (US)

(*) Notice: Subject to any disclaimer, the term of this patent is extended or adjusted under 35 U.S.C. 154(b) by 971 days.

(21) Appl. No.: 10/023,914

(22) Filed: Dec. 14, 2001

(65) Prior Publication Data

US 2003/0125945 A1 Jul. 3, 2003

(51) Int. Cl.
*G10L 15/00* (2006.01)
*G10L 15/26* (2006.01)

(52) U.S. Cl. ..................... 704/231; 704/235
(58) Field of Classification Search ............. 704/231, 704/235–242
See application file for complete search history.

(56) References Cited

U.S. PATENT DOCUMENTS 6,260,011 B1 * 7/2001 Heckerman et al. ........ 704/235
6,263,308 B1 * 7/2001 Heckerman et al. ........ 704/231
6,490,558 B1 * 12/2002 Kahn et al. ................. 704/235

* cited by examiner

*Primary Examiner*—David D. Knepper
(74) *Attorney, Agent, or Firm*—Sterne, Kessler, Goldstein & Fox PLLC

(57) ABSTRACT

Systems and methods for automatically improving a voice recognition system are provided. In one embodiment, the systems and methods retrieve voice recognition information produced by a voice recognition system in response to recognizing a user utterance. The voice recognition information comprises a recognized voice command associated with the user utterance and a reference to an audio file that includes the user utterance. The audio file is played and it is determined if the recognized voice command matches the user utterance included in the audio file. The user utterance is then transcribed to create a transcribed utterance, if the recognized voice command does not match the user utterance. The transcribed utterance is then recorded in association with the recognized voice command to monitor recognition accuracy.

60 Claims, 10 Drawing Sheets

FIG. 6A
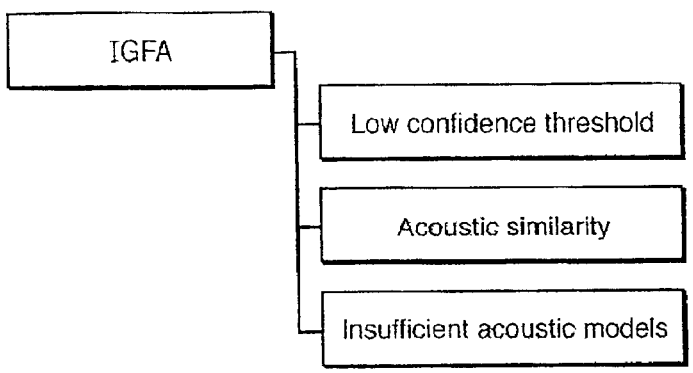
FIG. 6B
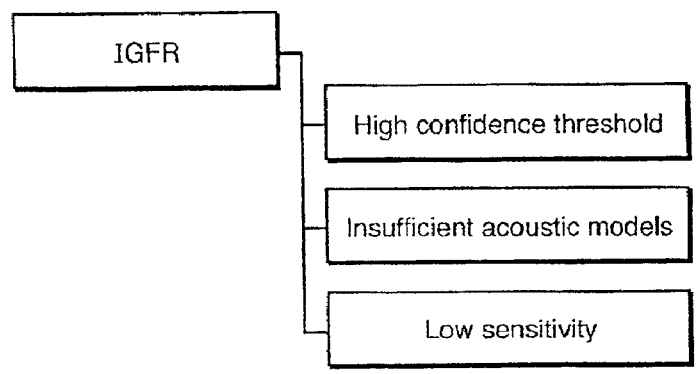
FIG. 6C
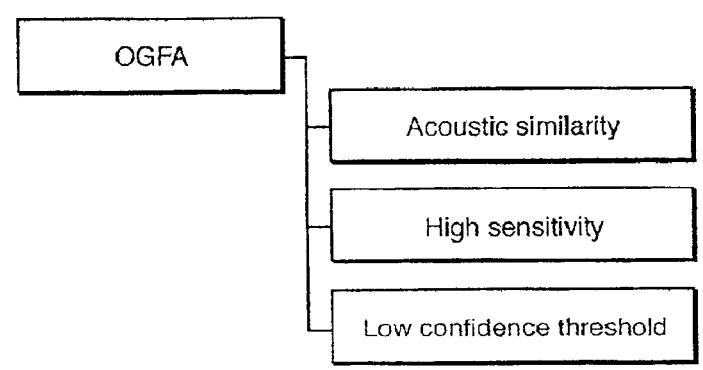
FIG. 6D
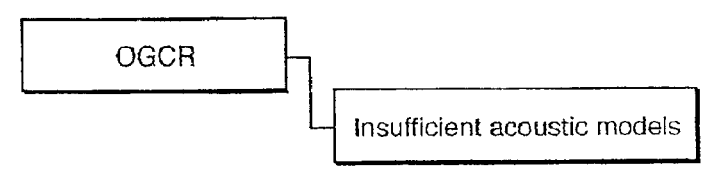
FIG. 6

AUTOMATICALLY IMPROVING A VOICE RECOGNITION SYSTEM

BACKGROUND

1. Field of Invention

The present invention relates generally to data analysis and, more particularly, to automatically improving a voice recognition system.

2. Related Art

Voice communication devices, such as telephones, traditionally have been used for mere voice communications or for accessing information using touch-tone dialing. With advancements in communications technology, today various types of information can be accessed using voice recognition systems that translate voice commands into system commands for data retrieval from an electronic system.

These voice recognition systems, however useful, are not perfect. Typically, a voice recognition system cannot recognize all voice commands or utterances spoken by the user. That is, a voice recognition system only recognizes utterances that are included within a recognition grammar. A recognition grammar defines the boundaries of utterances that can be recognized by a voice recognition system. A user is limited only to certain terms while interfacing with a voice recognition system in order to be understood.

In addition, voice recognition systems typically only understand certain common accents represented by respective acoustic models. For example, acoustic models have been created to recognize the following regional accents of the United States: Boston, New York, Southern, Texas, Midwest & West Coast. Thus, a user who speaks in a tone or accent other than that recognized by the recognition system, may have difficulty communicating with the system. That is, the system may fail to recognize a word or the phrase included in its grammar if the word or a phrase is spoken in a way that acoustically does not match what is expected by the system. For example, a voice recognition system which has acoustic models for various U.S. regional accents only may not properly recognize utterances which are spoken with an Australian accent. On the other hand, one utterance that is acoustically similar to another may be mistakenly recognized by the system as the latter. This leads to improper recognition and false rejects, thereby reducing system efficiency and contributing to user frustration.

To overcome the above-mentioned problems, the recognition results of a voice recognition system may be monitored for errors. According to previously developed techniques, a human operator inspects and analyzes any detected errors in order to hypothesize a solution. The human operator is then required to manually implement the solution into the system, and thereafter, the system is tested and monitored to verify that the solution has actually improved the system. However, due to the large number of errors that may occur over multiple sessions with many users, a human operator may not be able to effectively and efficiently handle the tasks of monitoring errors, hypothesizing, and implementing solutions. This is a very time consuming process, especially when performed by a human operator. Also it requires the human operator to have "expert knowledge" in the field to be able to make effective changes to the system.

SUMMARY

Systems and methods for automatically improving a voice recognition system are provided. In one or more embodiments of the invention, a voice recognition system produces voice recognition information in response to receiving a user utterance. The voice recognition information is stored in a call log and may comprise a recognized voice command associated with the user utterance. If the utterance is captured by the system, the voice recognition information further includes a grammar name, a confidence threshold, a recognition delay, and an audio file or a reference thereto.

A recognition grammar may comprise a set of terms or phrases and rules used to recognize a user utterance. A confidence threshold indicates recognition accuracy, for example, by defining or specifying the degree of acoustic similarity required for matching a user utterance with a term in the recognition grammar. A recognition delay is the amount of time it takes for the system to recognize a user utterance. The audio file or the reference identity can be, or specify, an audio file that includes a recording of a user utterance.

The accuracy of a voice recognition system may be determined by analyzing the voice recognition information. In one or more embodiments, transcription software is used to retrieve the voice recognition information stored in the call log. The audio file including the user utterance is played and the user utterance is transcribed to create a transcribed utterance. The transcribed utterance is then recorded, via the transcription software, in a transcription log along with the recognized voice command and the corresponding voice recognition information.

A recognition error is detected if the recognized voice command does not match a corresponding transcribed utterance. In some embodiments, each detected recognition error is recorded in an error log along with an error type. Errors can be classified as one of the following types: in-grammar false reject (IGFR), in-grammar false accept (IGFA), out-of-grammar false accept (OGFA). An IGFR type error is recorded if the transcribed utterance is part of the recognition grammar but the recognized utterance is not. An IGFA type error is recorded if the transcribed utterance is part of the recognition grammar and the recognized voice command does not match the transcribed utterance. An OGFA type error is recorded if the transcribed utterance is not part of the recognition grammar and the recognized voice command is mistakenly matched with an in-grammar word or phrase.

An and out-of-grammar correct reject (OGCR) type of indicator is recorded if the transcribed utterance is not part of the recognition grammar but the transcribed utterance is frequently recorded in the transcription log. Thus, a recurring out-of-grammar indicator may indicate that a certain utterance, though frequently used, is not readily recognized as included in the recognition grammar.

Because certain types of error are associated with certain reasons or sources of error, the system can hypothesize the sources of error based on the types of error recorded in the error log. Thus, the system, in one or more embodiments, analyzes the error types recorded in the error log to hypothesize at least one solution to eliminate the sources of error.

Accordingly, in one embodiment, if IGFA or OGFA type errors are recorded in the error log, the system may determine that a likely source of error is acoustic similarity between the recognized voice command and the user utterance. Acoustic similarity refers to similarity in the phonetic pronunciation of two words or phrases. If a user utterance has sufficient acoustic similarity to a term in the recognition grammar, the system considers the utterance to acoustically match that term. Yet the system detects an error if a user utterance is mistakenly matched with an improper word or phrase in the recognition grammar. This typically happens when the term or phrase is acoustically similar to the improperly recognized utterance.

Embodiments of the system may resolve this error by first determining if there are any acoustically different synonyms included in the grammar for the improperly recognized user utterance. If so, the acoustically similar word or phrase may be deleted from the grammar. As such, users may be prompted to use the acoustically different synonym instead of the deleted term or phrase that was confusingly similar. If there are no acoustically different synonyms in the grammar, the system may add one or more acoustically different synonyms before deleting the confusingly similar word or phrase.

If IGFA or IGFR type errors are detected, the system may determine a likely source of error to be lack of alternate pronunciations in the recognition grammar. Words, phrases, or commands included in the grammar are stored in the form of phonetic definitions or pronunciations (e.g., tomato=t ah m ey t o/t ah m ah t o). A phonetic definition can be a particular combination of phonemes, wherein a phoneme corresponds to a fundamental spoken sound in a given language. For example, spoken English may use about forty phonemes. For each phonetic definition, a set of acoustic models may be provided to handle or accommodate the way different people pronounce the same combination of phonemes. For example, someone in Texas typically omits the same sequence of phonemes for "howdy" as someone in New York, but the duration, emphasis, and pitch for each phoneme in the sequence may vary. Thus, a given word or phrase in a grammar may be recognized using a plurality of phonetic definitions along with associated acoustic models, representing different accents. Lack of sufficient phonetic definitions along with comprehensive acoustic models may result in particular vocalizations or pronunciations of a word or phrase being mistakenly rejected or accepted. If the system determines that the grammar lacks sufficient alternate pronunciations and/or comprehensive acoustic models, the system may add to the grammar additional phonetic definitions, or further train the associated acoustic models, representing alternative vocalizations for a word or phrase. The additional phonetic definitions and/or further trained acoustic models allow the voice recognition system to recognize a word or phrase when uttered in a greater variety of ways.

Another source of error may be a confidence threshold level that is too high or too low. In some embodiments a source of error is determined to be a high confidence threshold, if a high rate of IGFR type errors are detected. A voice recognition system with a high confidence threshold level requires, for acceptance of a user utterance, a high degree of acoustic similarity between the user utterance and the system's generalized acoustic representation of the utterance. Thus, in a voice recognition system with high confidence threshold setting, even a slight difference in acoustic similarity can cause the voice recognition system to reject a user utterance it otherwise should have accepted, leading to an IGFR. In this case, the system lowers the voice recognition system's confidence threshold level, so the voice recognition system is not so stringent in accepting user utterances. In one embodiment, the optimal confidence threshold may be determined from a table listing confidence thresholds and accuracy rates.

In certain embodiments, if an OGFA type error is detected, the system may determine the source of error to be a low confidence threshold. A voice recognition system with a low confidence threshold level may not require enough acoustic similarity, such that dissimilar or slightly similar acoustic models may be matched mistakenly. If the system detects this type of error, it raises the confidence threshold level of the voice recognition system to require a closer match between acoustic models.

Another source of error can be recorded environment noise that may be due to the voice recognition system's sensitivity threshold being set too high or too low. A sensitivity threshold is a value that defines a system's sensitivity in recording audio input. If a voice recognition system is highly sensitive, then even if the user is silent the voice recognition system accepts as input environment noise. Since environment noise is unlikely to be meaningfully recognized by the voice recognition system, its acceptance as input constitutes an error.

In some embodiments, the system may determine a source of error to be a low sensitivity threshold if an IGFR type error is detected. On the other hand, the system may determine a source of error to be a high sensitivity threshold if an OGFA type error is detected. To resolve an inappropriately high sensitivity setting, the system raises the sensitivity threshold such that reasonably low levels of environment noise are not accepted as input by the voice recognition system. On the other hand, if the voice recognition system is not sensitive enough, then it does not accept as input utterances that are provided at normal audio levels. Thus, such utterances are falsely rejected. In this case, the system may lower the sensitivity threshold such that utterances at normal audio levels are accepted.

Another noise-related source of error involves the timeout threshold. A timeout threshold, in one embodiment, is the minimum time duration of an utterance that is required for acceptance of that utterance by the system. Alternatively, a timeout threshold may define how much time a user has following a system prompt to begin a response. For example, if the timeout threshold is too short, then a user has very little time to begin speaking, thus contributing to user frustration. If the system detects this type of error, it may increase the timeout threshold. On the other hand, if the timeout is too long, then an excessive amount of environment noise may be recorded at the beginning of a recorded user utterance. The excess noise distorts the user utterance and decreases the likelihood of a match with the recognition grammar. In this case, the system may shorten the timeout threshold in order to reduce the amount of distorting noise recorded at the beginning of a user utterance by the voice recognition system.

Yet, another noise-related source of error involves the end-of-speech threshold. An end-of-speech threshold defines the maximum time length of an utterance that will be accepted by the system. Alternatively, an end-of-speech threshold may be defined as the length of the period of silence that the system monitors, after a user utterance, to determine if the user's utterance has been completed. In either case, if the end-of-speech threshold is too short, the user may not have adequate time to give a complete utterance, and therefore the utterance will not be correctly recognized. If the system detects this type of error, it increases the end-of-speech threshold to allow longer, more complete responses. On the other hand, if the end-of-speech threshold is too high, then an excessive amount of environment noise may be recorded at the end of a recorded user utterance. If the system detects this type of error, then the system decreases the end-of-speech threshold. Also, users want the system to respond promptly when they finish speaking; thus, to eliminate user frustration, the system may strive to set low end-of-speech threshold.

Another source of error is grammar perplexity. Perplexity is associated with the number of decision levels and the number of terms or phrases included in a grammar. It can be thought of as the average branching factor in the data structure associated with the grammar's vocabulary. A high perplexity grammar requires the system to perform many searches and comparisons before determining whether the user utterance is a part of the grammar. These many searches and comparisons may result in an excessively long delay in recognition of user utterances, which can frustrate the user. Furthermore, accuracy typically goes down in high perplexity systems. For example, it is more difficult to recognize one of 10,000 company names than it is to recognize one out of ten. If the system detects this type of error, it may search the recognition grammar for infrequently used terms and removes those terms. In this manner, the perplexity of the grammar will be reduced, thus increasing accuracy and lowering the delay in utterance recognition.

Another source of error is frequent out-of-grammar utterances. If certain utterances are frequently used by users, but have no corresponding term in the recognition grammar, those utterances will needlessly go unrecognized. If this type of error is detected, the system may modify the recognition grammar to include such frequent out-of-grammar utterances. Thus, those user utterances that are especially common will begin to be recognized by the system.

Based on at least one hypothesized solution, such as those described above, in one embodiment, the system modifies the initial configuration of the voice recognition system to implement a new configuration. The system then tests the voice recognition system to detect improvements in voice recognition accuracy. If accuracy is not improved, the initial configuration is restored.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

FIGS. 6A through 6D illustrate the association between exemplifying types and sources of error in a voice recognition system.

DETAILED DESCRIPTION

Figure 1:
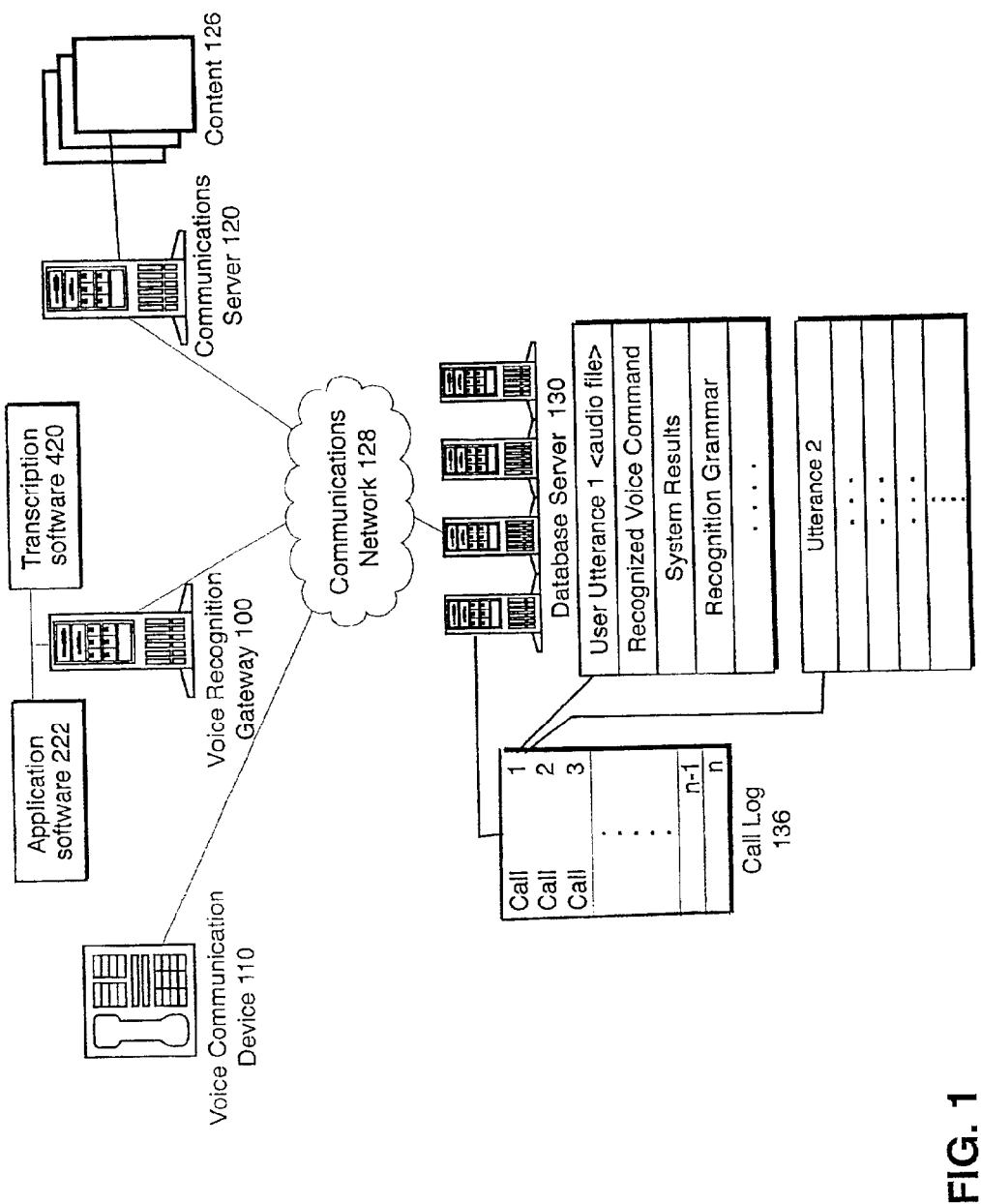
FIG. 1 illustrates an exemplifying environment in which a voice recognition improvement system, in accordance with one or more embodiments of the invention, may operate.

Information management systems and corresponding methods, according to one or more embodiments of the invention, facilitate and provide electronic services for improving the recognition quality of a voice recognition system by automatically detecting recognition errors and modifying the system to prevent such errors from occurring again.

The terms "electronic services" and "services" are used interchangeably throughout this document. A service provider may provide the services of the voice recognition system, in one or more embodiments. A service provider is an entity that operates and maintains the computing systems and environment, such as server system and architectures, which process and deliver information. Typically, server architecture includes the infrastructure (e.g., hardware, software, and communication lines) that offers the services.

In the following, certain embodiments, aspects, advantages, and novel features of the invention have been provided. It is to be understood that not all such advantages may be achieved in accordance with any one particular embodiment. Thus, the invention may be embodied or carried out in a manner that achieves or optimizes one advantage or group of advantages as taught herein without necessarily achieving other advantages as may be taught or suggested herein.

Nomenclature

The detailed description that follows is presented largely in terms of processes and symbolic representations of operations performed by conventional computers, including computer components. A computer may comprise one or more processors or controllers (i.e., microprocessors or microcontrollers), input and output devices, and memory for storing logic code. The computer may be also equipped with a network communication device suitable for communicating with one or more networks.

The execution of logic code (i.e., computer program) by the processor causes the computer to operate in a specific and predefined manner. The logic code may be implemented as one or more modules in the form of software or hardware components and executed by a processor to perform certain tasks. Thus, a module may comprise, by way of example, software components, processes, functions, subroutines, procedures, data, and the like.

The logic code conventionally includes instructions and data stored in data structures resident in one or more memory storage devices. Such data structures impose a physical organization upon the collection of data bits stored within computer memory. The instructions and data are programmed as a sequence of computer-executable codes in the form of electrical, magnetic, or optical signals capable of being stored, transferred, or otherwise manipulated by a processor.

It should also be understood that the programs, modules, processes, methods, and the like, described herein are but an exemplifying implementation and are not related, or limited, to any particular computer, apparatus, or computer programming language. Rather, various types of general purpose computing machines or devices may be used with logic code implemented in accordance with the teachings provided, herein.

System Architecture

Referring now to the drawings, FIG. 1 illustrates a system environment in which the invention according to one embodiment may operate. In accordance with one aspect, the environment comprises a voice recognition gateway 100 connected to a voice communication device 110 and a communications server 120. A user can use voice communication device 110 to access content 126 available on communications server 120. Voice recognition gateway 100 provides voice recognition services that allow voice communication device 110 and communications server 120 to connect and communicate. The terms "connected," "linked," "coupled," or any variant thereof, mean any connection or coupling, either direct or indirect, between two or more elements. The coupling or connection between the elements can be physical, logical, or a combination thereof.

Content 126 can be any data or information that is audibly presentable to users. Thus, in some embodiments, content can include written text (from which speech can be generated), music, voice, and the like, or any combination thereof. Content can be stored in digital form, such as, for example, a text file, an image file, an audio file, or a video file. In most embodiments, the content available for user access would be stored in the form of audible content in a database architecture, such as for example, one or more database servers 130, illustrated in FIG. 1.

In accordance with one aspect of the invention, voice recognition gateway 100, voice communication device 110, communications server 120, and database server 130 are connected and communicate via a communications network 128. One of ordinary skill in the art will appreciate that communications network 128 may advantageously be comprised of one or a combination of other types of networks without detracting from the scope of the invention. These networks can include, for example, Local Area Networks (LANs), Wide Area Networks (WANs), a private network, a public network, a value-added network, interactive television networks, wireless data transmission networks, two-way cable networks, satellite networks, interactive kiosk networks, and/or any other suitable communications network.

Communications network 128, for example, may comprise a public switched telephone network (PSTN) and/or a private system (e.g., cellular system) implemented with a number of switches, wire lines, fiber-optic cable, land-based transmission towers, and/or space-based satellite transponders. In one embodiment, the communications network 128 may include any other suitable communication system, such as a specialized mobile radio (SMR) system. The network may support a variety of communications, including, but not limited to, local telephony, toll (i.e., long distance), and wireless (e.g., analog cellular system, digital cellular system, Personal Communication System (PCS), Cellular Digital Packet Data (CDPD), ARDIS, RAM Mobile Data, Metricom Ricochet, paging, and Enhanced Specialized Mobile Radio (ESMR)).

The system may also utilize various calling protocols (e.g., Inband, Integrated Services Digital Network (ISDN) and Signaling System No. 7 (SS7) call protocols) and other suitable protocols (e.g., Enhanced Throughput Cellular (ETC), Enhanced Cellular Control (EC2), MNP10, MNP10-EC, Throughput Accelerator (TXCEL), and Mobile Data Link Protocol). Transmission links between system components may be analog or digital. Transmission may also include one or more infrared links (e.g., IRDA).

Communication device 110 may be any voice-based communication system that can be used to interact with voice recognition gateway 130. Communication device 110 can be, for example, a wired telephone, a wireless telephone, a smart phone, or a wireless personal digital assistant (PDA). Communication device 110 supports communication with voice recognition gateway 100, in the form of speech, for example. Communication device 110 may also support dual tone multi-frequency (DTMF) signals. In accordance with one or more embodiments, in order to access content available on communications server 120, a user using voice communication device 110 establishes a connection with communications server 120 through voice recognition gateway 100.

Each established connection represents a calling session during which the user can submit requests for accessing content stored on communications server 120. In each calling session, voice recognition gateway 100 listens for a voice command from a user. When voice recognition gateway 100 receives a user utterance, gateway 100 attempts to recognize the utterance. If the user utterance is recognized as a voice command, then voice recognition gateway 100 converts the command into an electronic request and forwards it to communications server 120. Communication server 120 processes and services the request, if possible, by providing the user with access to the requested content. One or more requests may be submitted and processed in a single call.

In accordance with one embodiment, application software 222 is executed on voice recognition gateway 100 to monitor voice recognition services provided by voice recognition gateway 100. To accomplish this task, application software 222 monitors user requests received during each call and creates a call log 136 that can be stored on database server 130 or any other information storage device. As illustrated in FIG. 1, each entry in call log 136 represents a call received. Each entry comprises a plurality of records, wherein each record is associated with a user utterance received during the call.

Each record may include a plurality of fields that include relevant information about the respective utterance. A first field may include an audio file for the user utterance, for example. The audio files, in one or more embodiments, may be played later to determine if the recorded utterance was properly recognized. A second field may include text representing a recognized voice command, for example. Other fields may include the system results, recognition grammar, and other information pertinent to the particular user utterance.

A user utterance should meet certain requirements. For example, a voice command should be recognized by voice recognition gateway 100 before it can be acted on. To be recognized, at least a part of the utterance needs to be included in a voice recognition grammar utilized by voice recognition gateway 100. A voice recognition grammar may comprise a set of terms or phrases (i.e., vocabulary) and rules associated with said terms or phrases. Once a user utterance is received, the voice recognition gateway 100 determines whether the utterance is part of the grammar's vocabulary. If so, the system then determines the rule associated with the term or phrase and services the request accordingly.

For example, assume that the system matches a user utterance "Get my mail" with the phrase "get mail" included in the recognition grammar. Referring to FIG. 1, in the above example, information recorded in call log 136 would include "Get my mail" as the user utterance and "Get mail" as the recognized voice command. Information recorded in call log 136 as system results would indicate that the action taken by the system in servicing the voice command was to retrieve user messages, for example. In embodiments of the invention, the recognition grammar may change depending on different factors. Thus, information identifying the grammar used for recognizing a user utterance is also recorded in call log 136.

In one or more embodiments of the system, application software 222 is implemented to execute fully or partially on one or more of the following systems: voice recognition gateway 100, communications server 120, and database server 130. Software 222 may comprise one or more independent modules or dependent sub-routines that, taken separately or collectively, provide one or more of the following services: voice transcription, voice recognition, and voice user interface. The voice transcription services can be used in the analysis of entries in call log 136 to detect any errors that may have occurred during voice recognition. These services may be provided by independently executing transcription software 420, as shown in FIG. 1 and as discussed in further detail below.

As used herein, the term "server computer" may refer to one or more computing systems that include server software for servicing requests submitted by devices or other computing systems connected to communications network 128 including voice recognition gateway 100. Content 126 may be stored on devices, other than communications server 120. The terms "server" and "server software" are not to be construed as limiting the scope of the invention in any manner.

Transcription Software

Figure 2:
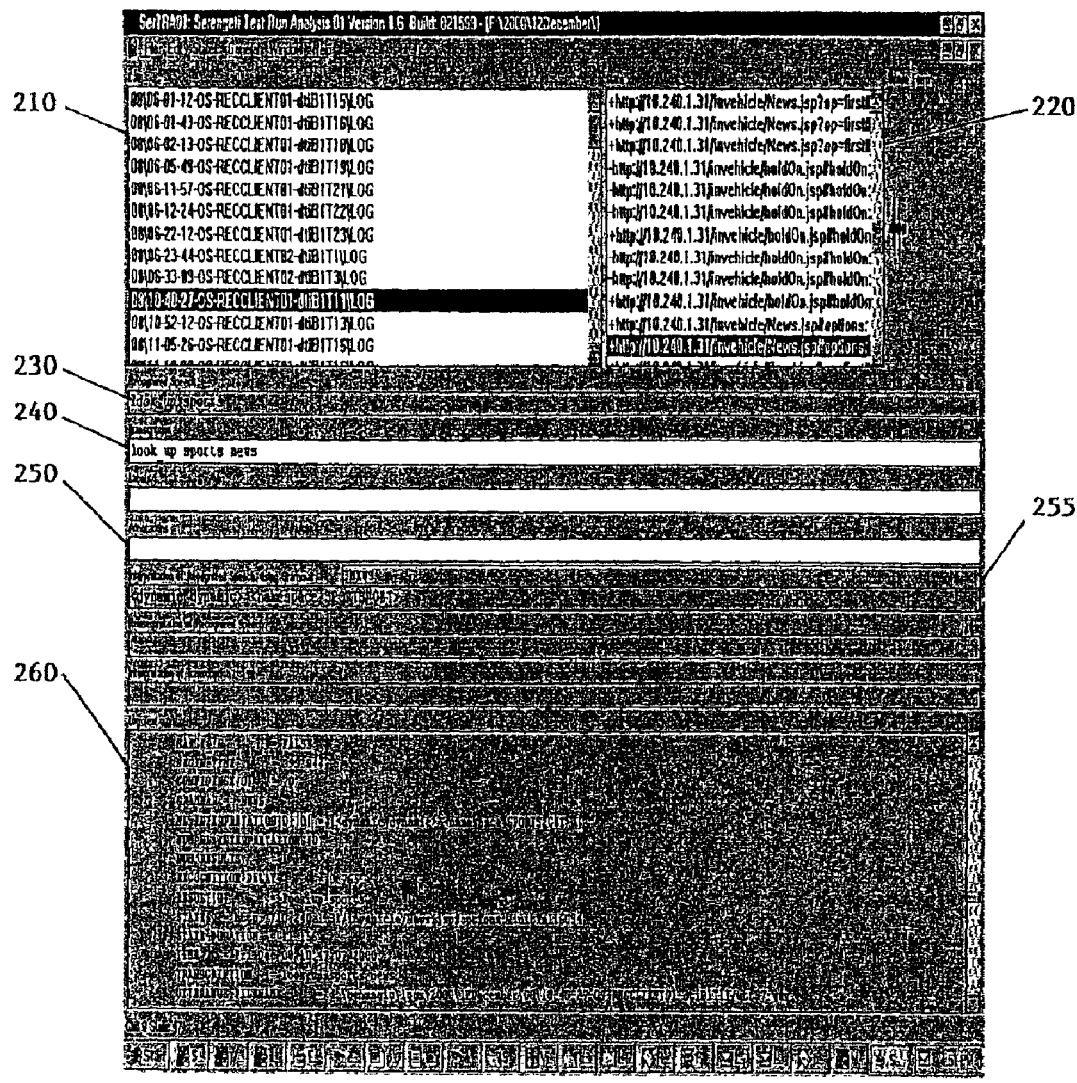
FIG. 2 illustrates an exemplifying graphic user interface (GUI) for a voice recognition transcription system, in accordance with one or more embodiments of the invention.

Referring to FIGS. 1 and 2, in one or more embodiments of the system, transcription software 420 may be executed on voice recognition gateway 100, for example, to analyze entries recorded in call log 136 for any errors that may have occurred during the process of voice recognition. As provided earlier, each entry in call log 136 includes detailed information about a user's utterance received by voice recognition gateway 100 and the recognition results for that utterance. FIG. 2 provides an illustration of an exemplifying graphic user interface (GUI) for transcription software 420.

Transcription software 420 can be utilized to view and analyze each entry in call log 136 to determine whether a user utterance was properly recognized, and if not, the possible reasons for the improper recognition. When transcription software 420 is executed, a GUI, such as that shown in FIG. 2, is provided to the human operator. The GUI may include several text and list boxes that display information about entries in call log 136. Boxes 210, 220, 230, 240, 250, 255, and 260 are exemplifying interface tools that can be utilized to implement transcription software 420's GUI, in accordance with one embodiment.

For example, list box 210 includes a list of references to individual calls in call log 136. A human operator may select a call by, for example, selecting a reference from the list presented in list box 210. List box 220 includes a list of audio files that correspond with a selected call in list box 210. Each audio file, for example, includes an audible presentation of a user utterance during the call. A human operator may play an audio file by selecting it from the list presented in list box 220. Text box 230 includes text representing the voice command as recognized by the system. That is, the entry in text box 230 indicates how the system interpreted or recognized a user utterance. In input box 240, a human operator can transcribe text that defines the user utterance. Input box 250 may be used for annotations and comments. Text box 255 includes the recognition grammar used to interpret a user utterance. Box 260 includes additional detailed information about the recognized utterance and how the utterance was recognized by the system.

Figure 3:
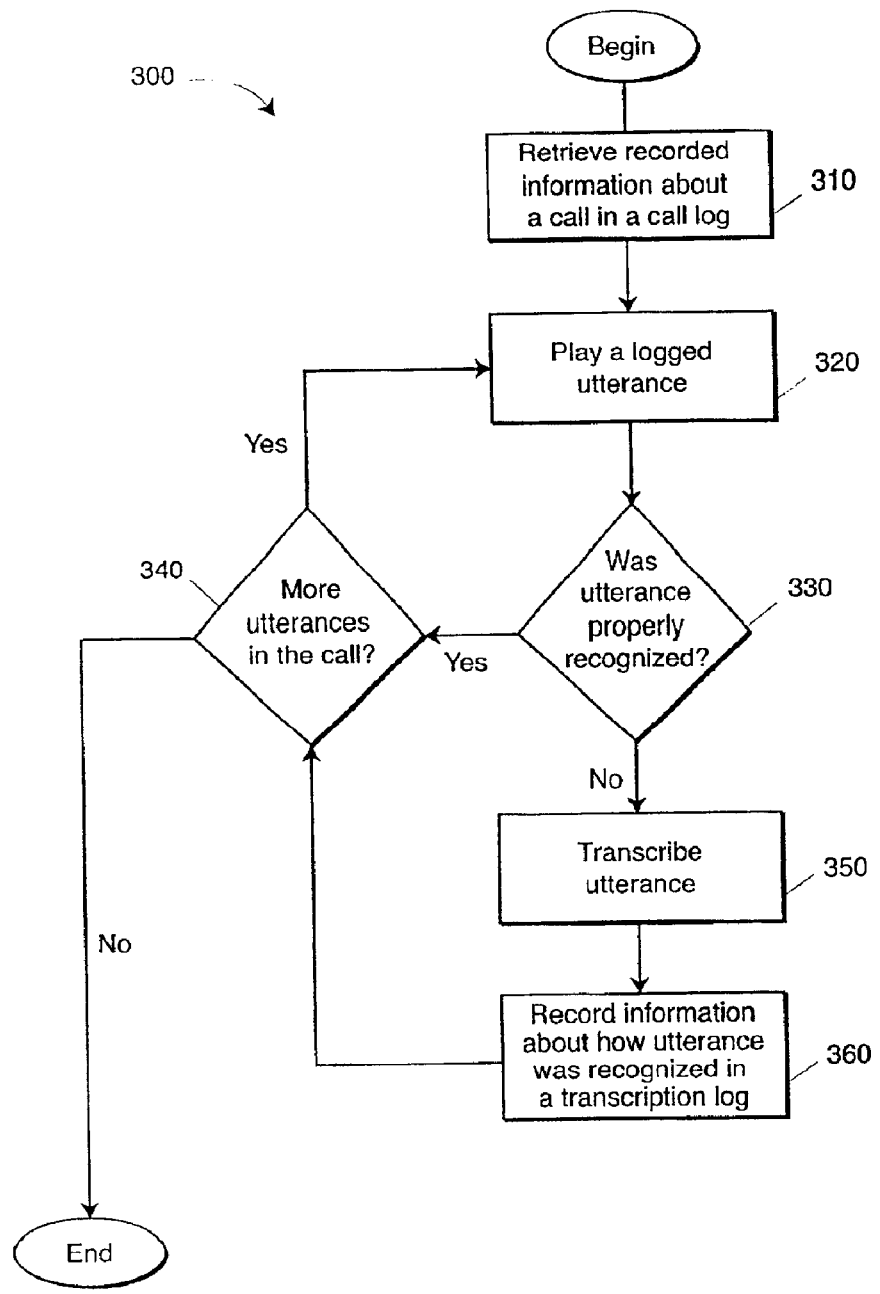
FIG. 3 is a flow diagram of a method of processing recognition information to determine recognition errors, in accordance with one or more embodiments.

FIG. 3 is a flow diagram of a method 300 of processing recognition information to determine recognition errors, in accordance with one or more embodiments. In particular, FIG. 3 illustrates a method 300 of using transcription software 420 to generate an error log 440 from call log 136 (see FIG. 4). At step 310, a human operator retrieves recorded information about a call by selecting an individual call from list box 210. The title of a call can, for example, indicate the time and date the call was received. Upon selection of an entry from list box 210, a list of audio files for each utterance received during the selected call is displayed in list box 220. When a human operator selects an audio file in list box 220, then additional information about the corresponding user utterance and recognition details is provided in boxes 230, 255, and 260, for example.

A human operator can interface with transcription software 420 to cause the system to play the selected audio file for the corresponding user utterance, at step 320. Once the audio file is played, the human operator can transcribe the utterance, which enables the system to determine whether or not it has properly recognized the user utterance by comparing the semantic values of what the system recognized versus what the human transcriber heard. Referring to entries included in FIG. 2, for example, an audio file may indicate that the actual utterance by a user was "look up sports news." By looking at text box 230, however, a human operator may see that the voice command as recognized by the system was "look up sports." Further, text box 260 may also provide the following information about the utterance, for example: the time and date the utterance was received or recognized, the confidence level and other threshold settings used in tuning the recognition grammar, the result of recognition, the amount of delay in recognition, and the path and name of the audio file associated with the user utterance.

At step 330, after reviewing the provided information for the selected utterance, and after the human operator has transcribed the user utterance, the system determines whether it was properly recognized. If the utterance was properly recognized, then at step 340 it is determined if there are any further utterances in the selected call. If additional utterances are associated with the selected call, the system then returns to step 320 and the next logged utterance is played.

If at step 330, it is determined that the user utterance was improperly recognized, then the human operator at step 350 inputs the correct utterance in input box 240 and enters any additional comments or annotations in input box 250, for example. At step 360, information about the analyzed utterance is recorded in a transcription log 430 (see FIG. 4). Entries recorded in transcription log 430 can include the following information, for example: the transcribed utterance, recognized voice command, system results, recognition grammar, and other system settings at the time of recognition, such as the recognition grammar's confidence level.

Thus, using transcription software 420, a human operator can view one or more entries recorded in call log 136 and determine which entries are associated with user utterances that were erroneously recognized by the system. These entries are then recorded by transcription software 420 in transcription log 430 for further analysis. For example, as described in further detail below, the entries in transcription log 430 may be analyzed to determine the type of error associated with each erroneous recognition.

In embodiments of the system, transcription software 420 may be used to perform such analysis and create an error log 440. Each entry in error log 440 is associated with one or more entries in call log 136 and/or transcription log 430. In alternative embodiments, a single or a plurality of logs or data structures may include or represent entries or information stored in error log 440 as well as entries or information stored in transcription log 430. In general, any suitable number or type of data structures can be used to store this information.

While transcription log 430 may include one or more entries that provide detailed information about an improperly recognized utterance, error log 440 includes information about the type of error associated with each improperly recognized utterance. For example, if the phrase "Get my mail" is a part of recognition grammar, but the utterance "Get my mail" is nonetheless rejected by the system, then this is an instance where an in-grammar utterance is falsely rejected (i.e., an "IGFR"). Thus, an entry in error log 440 would reflect that such an error has occurred.

In one or more embodiments of the system, information included in call log 136, transcription log 430, and error log 440 may be stored and organized in database server 130 or other data storage systems connected to voice recognition gateway 100. Information stored about the calls and user utterances processed by voice recognition gateway 100 can be accessed by software, such as application software 222, to determine the types and sources of any errors, and to improve the overall efficiency of the system by implementing solutions to resolve the detected errors.

Application Software for Improving Voice Recognition

Figure 4:
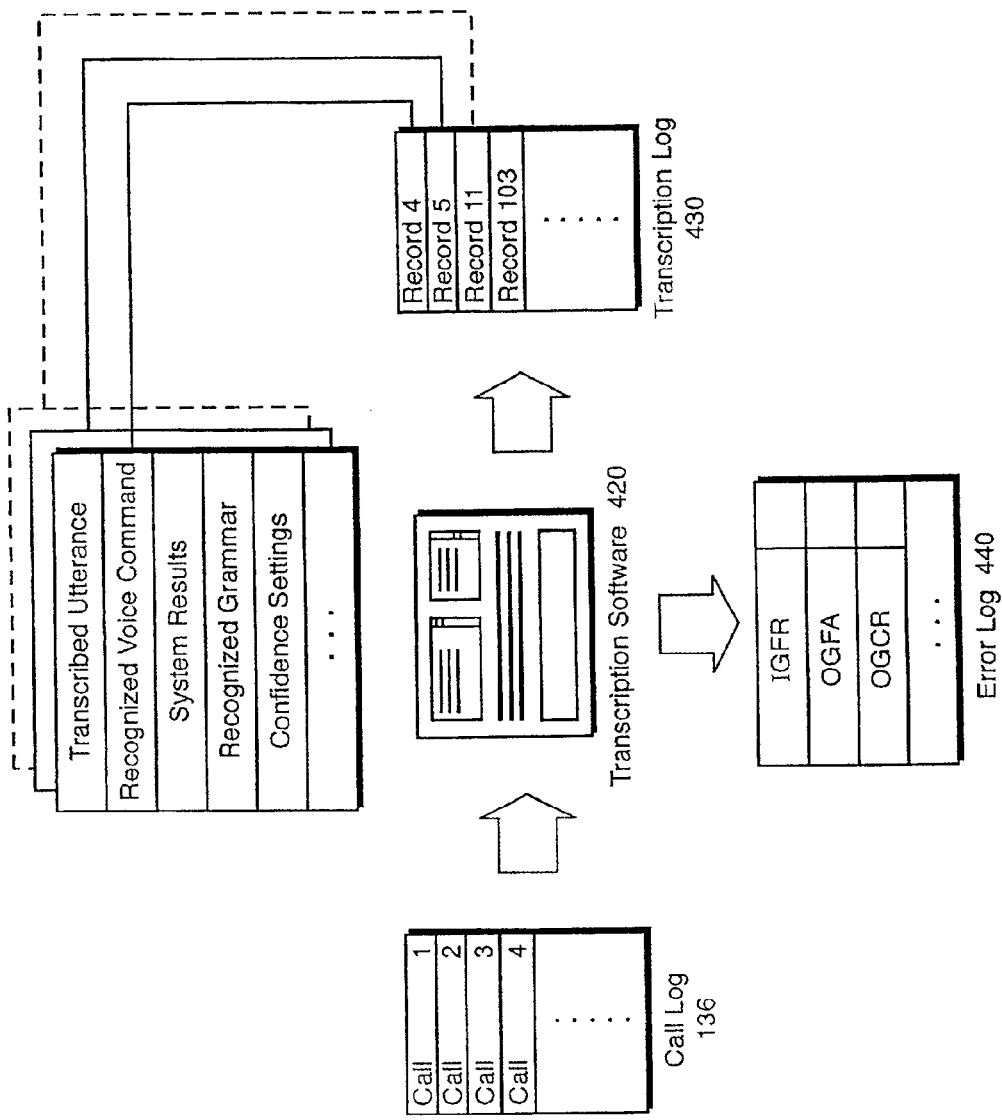
FIG. 4 is a block diagram illustrating exemplifying logs and content thereof analyzed and generated by transcription software, in accordance with one or more embodiments.
Figure 5:
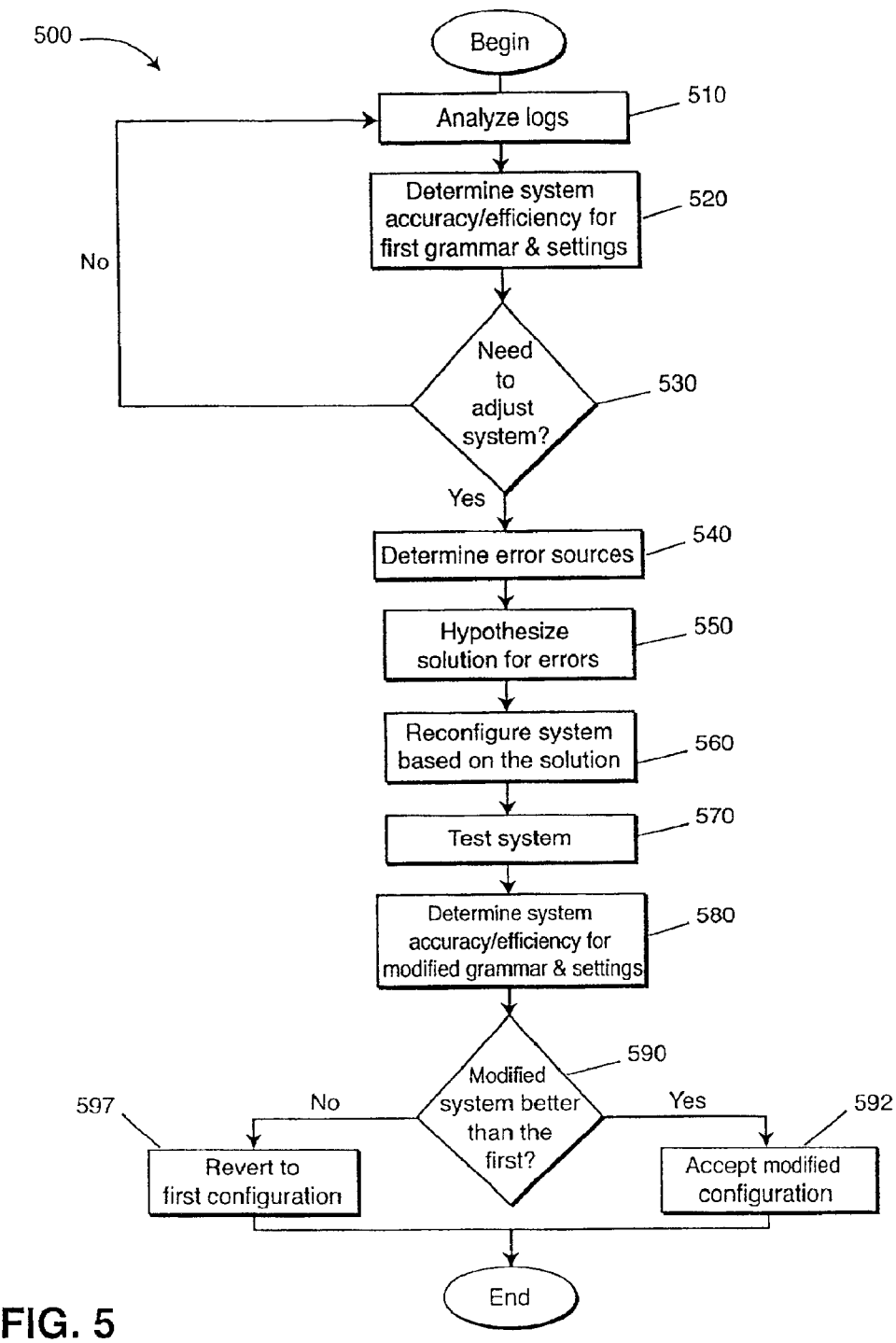
FIG. 5 is a flow diagram of a method of analyzing voice recognition information to determine and to automatically adjust voice recognition accuracy, in accordance with one or more embodiments.
Figure 7A:
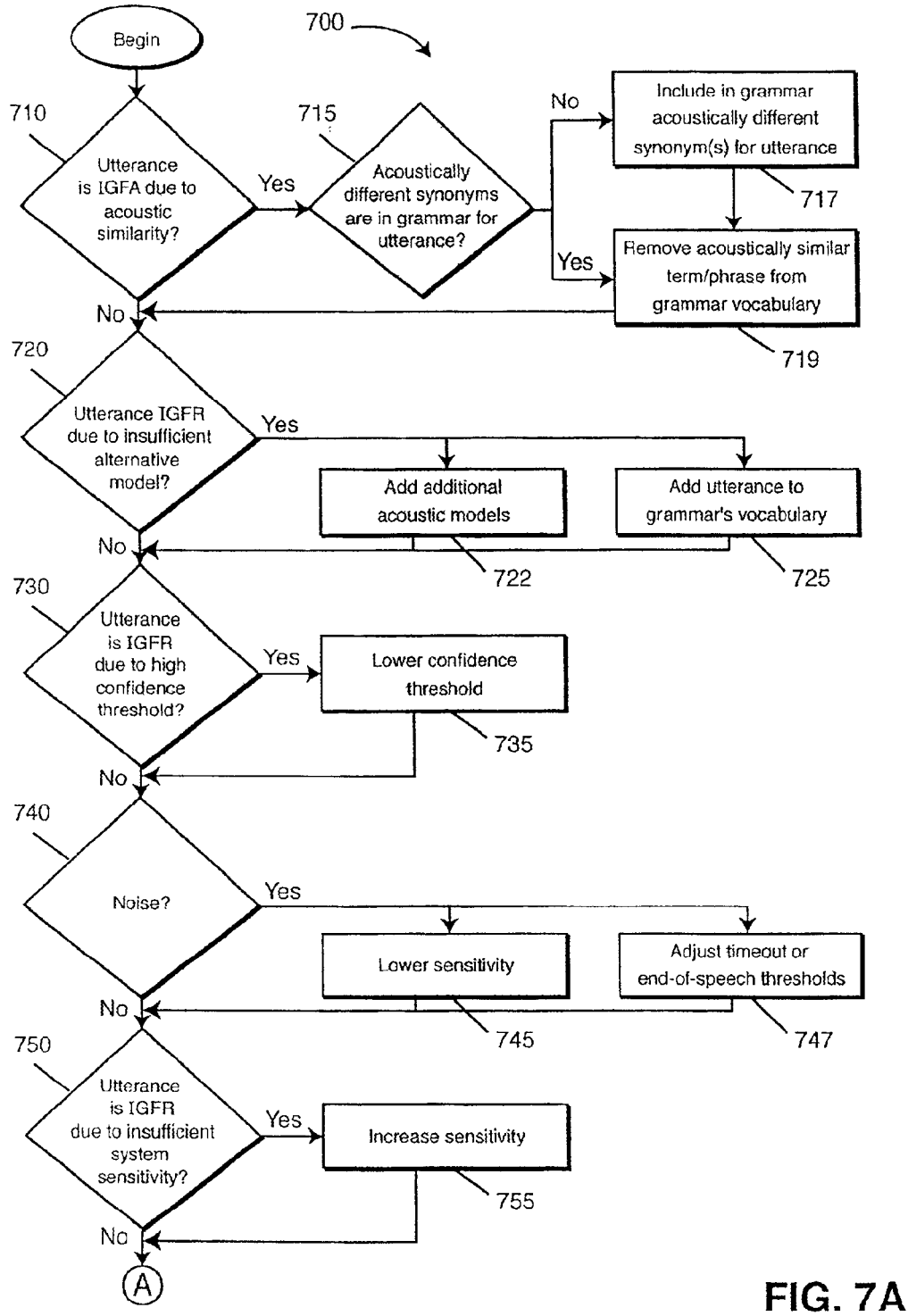
FIGS. 7A and 7B, in combination, illustrate a flow diagram of a method of adjusting a voice recognition system, in accordance with one or more embodiments.
Figure 7B:
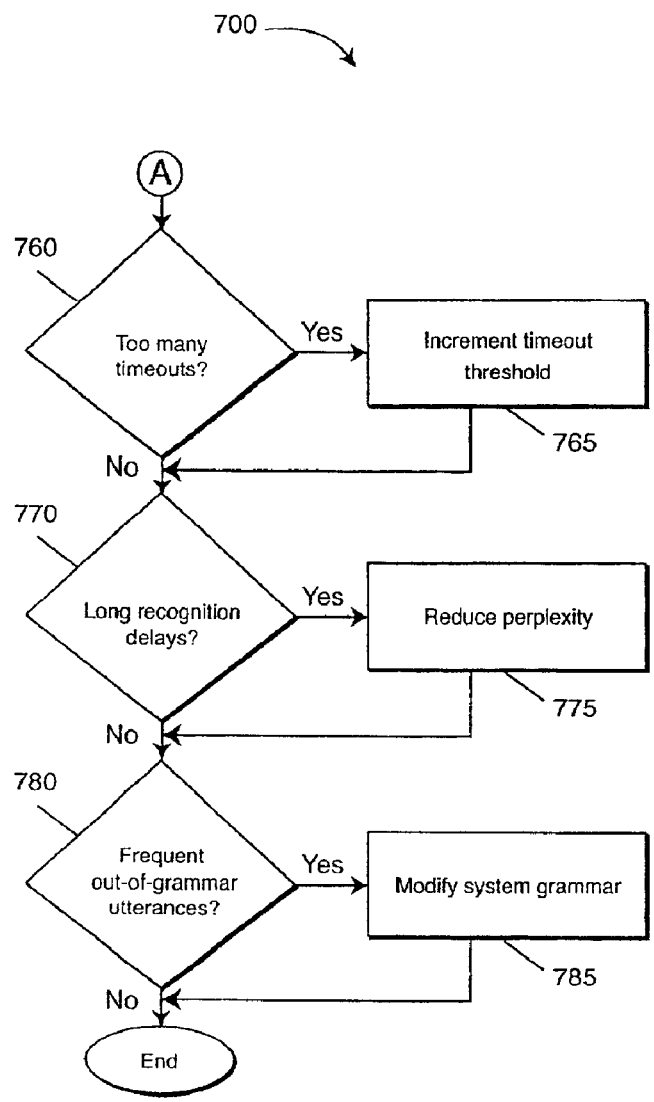

Referring to FIGS. 1 and 4, in accordance with some embodiments of the invention, application software 222 in conjunction with transcription software 420 executes on voice recognition gateway 100 or other computing system to provide automated services for receiving, processing, and responding to voice requests submitted via communication device 110, in a series of actions illustrated in FIGS. 5, 7A and 7B.

The actions illustrated in FIGS. 5, 7A and 7B need not necessarily take place in a certain order. These actions, and the order thereof, are provided by way of example and shall not be construed to limit the scope of the invention. Other embodiments and implementations may be possible. As such, in one embodiment, application software 222 is utilized to improve the quality of voice recognition services provided by voice recognition gateway 100. To accomplish this, at step 510 in FIG. 5, application software 222 causes the system to analyze system logs, such as call log 136, transcription log 430, and error log 440, to determine the accuracy or efficiency level of the system.

The accuracy and efficiency levels can be determined based on the number of correct or incorrect recognition results as recorded in one of the logs mentioned above. For example, in one embodiment, the system tracks the number of false accepts or false rejects in relationship to one or more particular utterances or call sessions. System settings, such as the confidence threshold, for example, may be also monitored to determine types and sources of error, and system recognition accuracy, for example.

Appendices A and B at the end of this disclosure provide exemplifying statistical data that can be generated by application software 222 after analyzing voice recognition data stored on database server 130. Appendix A provides an exemplifying list that reflects the recognition accuracy level of the system at various confidence thresholds. The first entry of Appendix A, for example, indicates that when confidence threshold is set to a maximum (e.g., in this case 0) recognition accuracy is at 92.71%, with 7.29% of the utterances incorrectly recognized, and 0.00% of the utterances rejected. In accordance with one embodiment, lowering the confidence level (e.g., setting confidence level to 30) lowers the accuracy level to 79.63%, with 5.26% of the utterances incorrectly recognized, and 15.11% rejected.

Entries in Appendix B illustrate the rate of correctly rejected utterances in an exemplifying embodiment. For example, according to Appendix B, when the confidence threshold is set to 50, the out-of-grammar user utterances are correctly rejected at a rate of 53% (for this particular application).

Thus, using the information recorded in system logs, the system determines and assigns an accuracy and efficiency level to the existing voice recognition system at step 520. Based on the calculated accuracy and efficiency levels, at step 530, the system determines if the voice recognition system needs to be adjusted to produce better results. For example, if the calculated accuracy level falls below a certain threshold, then the system at step 540 determines the sources of error. Otherwise, the system returns to step 510 and continues to analyze the system logs. As mentioned earlier, in certain embodiments, the sources of error are determined by transcription software 420 at the time error log 440 is generated. In some other embodiments, however, the act of determining sources of error is performed by application software 222 independently or in cooperation with transcription software 420.

In embodiments of the system, transcription log 430 includes information about each improperly recognized utterance and error log 440 includes the error types for each entry in transcription log 430. At step 540, application software 222 causes the system to analyze entries recorded in the system logs to determine the possible sources of error. Sources of error can be either defined based upon information retrieved from one or more entries recorded in the system logs collectively, and/or based on analyzing single entries in each log. Other system attributes and settings (e.g., average branching factor, confidence, timeout, end-of-speech, and sensitivity thresholds) may also be taken into consideration in one or more embodiments to further pinpoint particular sources of error.

Once the system has determined the sources of error, then at step 550 the system hypothesizes solutions that can resolve system inefficiencies and prevent certain errors from occurring. Exemplifying methods for hypothesizing solutions for various sources of error are illustrated in FIGS. 7A through 7B. Once the system has hypothesized one or more solutions, the system at step 560 reconfigures the voice recognition system based on one or more hypothesized solutions. The system may, for example, add or delete certain phonetic definitions or pronunciations to the recognition grammar or modify threshold settings depending on the types of errors detected and the solutions hypothesized.

At step 570, the system tests the modified recognition grammar and configurations to determine whether the hypothesized solutions successfully resolve the recognition problems associated with the system. To test the system, the same utterances included in call log 136 are fed to the reconfigured voice recognition system. New error logs and transcription logs created in the test round are, at step 580, analyzed to determine the accuracy and efficiency levels of the recognition grammar and configurations as modified. At step 590, if the system determines that the modified configuration has improved recognition accuracy and efficiency, then the system at step 592 accepts the modified configuration. Otherwise the system at step 597 reverts to the previous configuration.

Certain sources of error can lead to generation of various types of errors, some of which are illustrated in FIGS. 6A through 6D. In accordance with some embodiments of the invention, to determine the types of error based on an entry in transcription log 430, the system compares the transcribed utterance with the recognized voice command. This comparison allows the system to classify recognition errors into two broad categories: (1) falsely accepted utterances, and (2) falsely rejected utterances.

A user utterance is considered to be recognized, and thus accepted, if the utterance is determined to be part of the recognition grammar. Otherwise, the utterance is determined to be out of grammar and is rejected. An utterance is falsely accepted when the utterance is mistakenly recognized. An utterance is falsely rejected when the utterance is not recognized even though it is a part of recognition grammar. Comparing the transcribed utterance with the voice command as recognized allows the system to determine whether the utterance was falsely accepted or rejected.

The above two broad error categories (i.e., false accept or false reject) can be further divided into error types that identify the sources of error more specifically. An exemplifying list of such error types, a discussion of possible sources of error for each type, and corresponding methods for resolving such errors are provided below, in accordance with some embodiments of the invention.

In Grammar False Accept (IGFA): The system detects an in-grammar false accept or IGFA type error, if both the transcribed utterance and the recognized voice command are part of the recognition grammar, but the semantic value of the transcribed utterance is not the same as the semantic value of the recognized voice command. That is, the utterance should be recognized as a certain word or phrase in the grammar, but instead was recognized as another word or phrase. Thus, the system detects a case of IGFA error, for example, if the transcribed utterance is "read it" and the recognized voice command is "delete it," where both "read it" and "delete it" are part of the recognition grammar. On the other hand, if a user says "please read it" and the system recognizes "read it," there is no error since both commands have the same semantic value (from the system's perspective).

In Grammar False Reject (IGFR): The system detects an in-grammar false reject or IGFR type error, if the transcribed utterance is part of the recognition grammar but the user utterance is not recognized and is therefore rejected. In embodiments of the system, the data recorded in transcription log 430 may be equal to "null" or other symbol or keyword to indicate that the user utterance was not recognized as a voice command included in the recognition grammar. Thus, the system detects a case of IGFR error, for example, if the transcribed utterance is "read it" and the recognized voice command is "null."

Out of Grammar False Accept (OGFA): The system detects an out-of-grammar false accept or OGFA type error, if the transcribed utterance is not part of the recognition grammar, but the recognized voice command is. In such a case, an utterance should not be recognized, but is nonetheless recognized by the voice recognition system mistakenly. Thus, the system detects a case of OGFA error, for example, if the transcribed utterance is "John Smith" and the recognized voice command is "Jeff Smith," where "John Smith" is not included in the recognition grammar but "Jeff Smith" is.

Out of Grammar Correct Reject (OGCR): The system detects an out-of-grammar correct reject or OGCR type of indicator, if the transcribed utterance is not part of the recognition grammar, but it desirably could be added to the recognition grammar. This type of indicator occurs where the voice recognition system does not recognize a frequently received user utterance. Thus, for example, the system detects a case of OGCR, if users frequently say "play it" in order to hear their voicemail messages but the recognition grammar is not implemented to recognize such a user utterance to perform this function. Note that this type of error may be considered a "correct" rejection since in general the correct behavior for the system is to reject out-of-grammar utterances. The system can hypothesize that a frequent recurring out-of-grammar utterance is actually an OGCR. In one embodiment, this can be confirmed by a human operator.

As indicated earlier, certain types of errors can be traced to certain sources of error. Thus, in certain embodiments of the system, once the type of error has been determined, then the system determines the sources of error. As discussed herein, depending on implementation, the steps involving determining the types and sources of error based on information included in transcription log 430 and error log 440 can be carried out either jointly or independently by one or both transcription software 420 or application software 222.

The determination or identification of various types of errors by analyzing entries included in transcription log 430 to create entries in error log 440 has been described above. The various types of error sources and their relationship to the types of errors identified earlier are now described. The following sources of error are provided by way of example. One skilled in the art would appreciate that other sources of error may be determined by analyzing system settings and other information recorded in, for example, error log 440.

Acoustic Similarity

Acoustic similarity refers to similarity in the phonetic pronunciation of two words or phrases. That is, two words or phrases that sound similar are said to be acoustically similar. The system translates a user utterance into a string of phonemes (i.e., fundamental spoken sounds) which can be represented by acoustic models based on features extracted from the sound wave associated with the user utterance. Words, phrases, or commands included in the recognition grammar are stored in the form of phonetic strings representing acoustic models. For example, the word "dog" can be phonetically defined by a string of three phonemes "d aw g." There are about 40 different phonemes, or basic sounds, in the English language and all English words can be defined by some combination of these phonemes. Typically, speech recognition software has one or more acoustic models associated with each phoneme.

Recognition grammars that include acoustically similar commands are prone to errors in recognition. This is because acoustically similar commands can be confused with one another. In one embodiment, to determine if a user utterance matches a command in the recognition grammar, the phonetic definitions for the two are compared. A match is found if the phonetic definition for the user utterance is sufficiently similar to the phonetic definition of a command in the recognition grammar. Thus, if the phonetic definition of more than one command in the recognition grammar is sufficiently similar to that of the user utterance, then the user utterance may be improperly recognized.

The degree of similarity between two phrases (or utterances), is established by reducing each phrase to its constituent phonemes and determining the number of identical phonemes between the two phrases. A phoneme may be the smallest phonetic unit in an acoustic model and is determined based on pronunciation rather than spelling. Thus, a collection of phonemes in a particular sequence makes up a term or phrase of the grammar's vocabulary. If two phrases share a high number of identical phonemes in a similar arrangement, then the two phrases are said to be close or acoustically similar.

In one or more embodiments, in order to recognize a user utterance, the system compares the phonetic definition of the user utterance with the phonetic definitions included in the recognition grammar. One or more phonetic definitions included in the recognition grammar can be associated with a certain command. If an exact or a close match is found for the utterance in the grammar, then the system performs the function associated with the command. Otherwise, the utterance is not recognized.

Referring to FIGS. 6A and 6C, respectively, IGFA and OGFA type errors can result from acoustic similarity, because a user utterance may be mistakenly matched with a word or phrase in the recognition grammar that is acoustically similar to it. For example a false accept may occur when a user says "read it" and the system mistakenly recognizes it as "delete it," because the phonetic definitions for "delete it" (as included in the recognition grammar) and "read it" (as uttered by the user) are similar. If the phrase "read it" is part of the grammar, then there is an IGFA type error; otherwise, there is an OGFA type error, as explained earlier.

Referring to FIG. 7A, at step 710, application software 222 causes the system to analyze one or more entries in error log 440 to determine whether any of the entries recorded in error log 440 are due to acoustic similarity. For example, in accordance with one embodiment, if at step 710 the system detects an IGFA type error that is due to acoustic similarity, then the system at step 715 determines if there are any acoustically different synonyms included in the grammar for the improperly recognized user utterance.

If no acoustically different synonyms are included in recognition grammar, then at step 717 the system adds to the grammar an acoustically different synonym for the utterance. Thereafter, at step 719, the system removes the acoustically similar term or phrase from the grammar's vocabulary. As such, the system replaces the improperly recognized term or phrase included in the vocabulary with one that cannot be easily confused with the user utterance.

For example, if "read it" is being confused with "delete it" because the two phrases are acoustically similar, then the system would, for example, remove "delete it" from the grammar's vocabulary and substitute it with "get rid of it". The phrase "get rid of it" is not acoustically similar to "read it" and therefore cannot be as easily confused by the system.

If at step 715, the system determines that acoustically different synonyms are included in the recognition grammar, then the system at step 719 removes any confusingly similar acoustic models from the grammar's vocabulary. In the above example, if the recognition grammar included "read it," "delete it," and "get rid of it," then the system would remove "delete it" from the grammar's vocabulary.

The voice recognition system, in some embodiments, is modified to provide a prompt or notification to the user instructing the user not to use the phrase "delete it" and instead use the phrase "get rid of it," a phrase that is phonetically more distinct from the phrase "read it."

In one embodiment, the Levenstein algorithm or a modification thereof can be used to calculate the phonetic distinction between two acoustic models. The Levenstein algorithm relates to a dynamic programming technique, originally developed to correct errors in binary transfer. The Levenstein algorithm is understood by those skilled in the art. The more recent Levenstein Distance Algorithm (LDA) provides a simple metric for testing the similarity of strings. A modified version of LDA can be used to find the closest alignment of two phoneme strings, generating an acoustic similarity score in the process. For example, the chart provided immediately below is a Levenstein phoneme alignment for the word "operating" with its canonical pronunciation along the vertical axis and a recognized phoneme string based on what the user said along the horizontal access. The score in the upper right corner represents the "cost of matching" the two words. In this example, the cost is 4. It can be noted that "cl" represents an unvoiced or silent phoneme.

| | | | | | | | | | |
|---|---|---|---|---|---|---|---|---|---|
| ng | 8 | 7 | 6 | 5 | 4 | 4 | 3 | 3 | 4 |
| ih | 7 | 6 | 5 | 4 | 3 | 3 | 2 | 3 | 4 |
| t | 6 | 5 | 4 | 3 | 2 | 2 | 3 | 4 | 5 |
| cl | 5 | 4 | 3 | 2 | 1 | 2 | 3 | 4 | 4 |
| ey | 4 | 3 | 2 | 1 | 2 | 3 | 3 | 4 | 5 |
| er | 3 | 2 | 1 | 0 | 1 | 2 | 3 | 4 | 5 |
| p | 2 | 1 | 0 | 1 | 2 | 3 | 4 | 5 | 6 |
| cl | 1 | 0 | 1 | 2 | 3 | 4 | 5 | 6 | 7 |
| aa | 0 | 1 | 2 | 3 | 4 | 5 | 6 | 7 | 8 |
| | aa | cl | p | r | vcl | d | ih | n | cl |

Insufficiently Trained Acoustic Models

Different people can vocalize the same word differently, depending on the tone of their voice, nationality, background, neighborhood, accent, health condition, sex, age, pronunciation and enunciation habits, and many other factors. For example, imagine how a person from Texas versus a person from New York would pronounce the phrase "move on." Or, consider how a young girl's voice differs from an old man's. Thus, a single word may be associated with literally hundreds of different sounding ways of saying it, generally represented by a set of (i.e., one or more) acoustic models representative of all such vocalizations.

The voice recognition system, according to one or more embodiments of the system, can be implemented so that a system command is associated with a plurality of acoustic models. For example, the recognition grammar may include a set of acoustic models for different ways the phrase "move on" can be pronounced. Also, the recognition grammar may include synonyms of that phrase, such as "next" and "get the next one."

Referring to FIGS. 6A, 6B, and 6D, an insufficiently trained set of acoustic models in a recognition grammar can result in IGFA, IGFR, and OGCR type errors. False reject type errors that result from this shortcoming occur when the system cannot recognize a user utterance because the grammar's vocabulary does not have sufficient acoustic models to match a variety of user utterances. For example, a recognition grammar may include various acoustic models for the phrase "move on," but none corresponding to how a person with a New York accent might pronounce the phrase. Consequently, the system fails to recognize "move on" when pronounced with a New York accent because the utterance does not match any existing acoustic model for "move on."

False accept type errors that result from insufficiently trained acoustic models occur when another acoustically similar model is matched with the user utterance mistakenly because the grammar's vocabulary fails to include an acoustic model that matches a user utterance with more accuracy. For example, "read it" may be mistakenly recognized as "delete it," if the grammar vocabulary does not include sufficient acoustic models for the phrase "read it."

At step 720, the system analyzes the logged entries to determine if a lack of sufficient alternative acoustic models in the recognition grammar is the source of error for any entries. By analyzing the entries, the system determines a term or phrase that is underrepresented with respect to the number of alternative acoustic models. For example, the analysis may show that user utterances for "delete it" are improperly recognized as "read it" when the user is a woman, but properly recognized when the user is a man. Such analysis, indicates that the system does not include sufficient acoustic models for "delete it" as vocalized by women.

Once an underrepresented class of acoustic models is detected, at step 722, the system adds to the grammar additional acoustic models for that particular class. Alternatively, or in addition to step 722, the system may at step 725 add the rejected user utterance to the grammar's vocabulary as a possible alternative acoustic model. Thus, in the above example, the system adds one or more voice utterances by women for "delete it" and similar sounding phrases (i.e., comprising similar phonemes) to the recognition grammar to remedy and minimize improper recognition possibilities. In certain embodiments, the system also generates a report indicating that additional voice utterances by women for "delete it" should be added to the grammar.

Confidence Threshold

The confidence threshold is a value that is used to set the acceptance level of utterances. In one embodiment, the confidence threshold defines the degree of acoustic similarity required for recognition. Recognition accuracy is highest when the acoustic model of an utterance exactly matches that of a term or phrase included in the recognition grammar. Generally, a lower confidence threshold setting eases recognition. That is, a user utterance that is not an exact acoustic match with an in-grammar vocabulary has a higher chance of being recognized if the confidence threshold is relatively low.

Due to the above factors, the confidence threshold also has an inverse relationship with recognition accuracy. That is, the chances for improper recognition due to acoustic similarity increase as the confidence threshold is lowered. Referring to FIGS. 6A and 6C, a low confidence threshold can result in IGFA and OGFA type errors because a low confidence threshold lowers the voice recognition system's requirement for a close acoustic match. As a result, non-similar or slightly similar acoustic models may be matched mistakenly. On the other hand, a high confidence threshold can result in an IGFR type error (FIG. 6B), because in such a case even slight differences in acoustic similarity can cause the voice recognition system to improperly reject a user utterance.

In one embodiment, the system analyzes the logged entries to determine if the confidence threshold is the source of any errors. For example, as discussed, recorded entries for IGFA and OGFA type errors may be associated with a low confidence threshold, while entries for IGFR type error may be associated with a high confidence threshold. At step 730, the system determines whether the user utterance is falsely rejected due to a high confidence threshold. If so, the system at step 735 lowers the confidence threshold. Alternatively, if the system determines that a user utterance is falsely accepted, in one or more embodiments, the system raises the confidence threshold.

In certain embodiments, the voice recognition system settings, including the confidence threshold, are adjusted so that the number of false accepts and false reject type errors are minimized and the number of out-of-grammar correct rejects are maximized. For example, in one embodiment, the system calculates the recognition accuracy rate based on the number of correct accepts and correct rejects recorded in the system logs. By analyzing the accuracy results, the system may adjust the confidence threshold to improve recognition accuracy.

In one embodiment, the system confidence threshold is set so that out-of-grammar correct reject rate is at least 50% and the in-grammar false reject rate is equal to twice the in-grammar false accept rate. Other embodiments of the invention may be implemented with other confidence thresholds, depending on the voice recognition system's recognition accuracy. In embodiments of the invention, the system periodically monitors recognition data to determine recognition accuracy. The confidence threshold, in certain embodiments, is periodically adjusted as the system accuracy changes.

Sensitivity, Timeout, and End-of-Speech Thresholds

Some voice recognition systems are implemented to ignore user utterances that are below a certain audio level. That is, if a user speaks too softly or too quietly, then the voice recognition system will not consider the utterance for recognition. The sensitivity threshold is a value that defines sensitivity in recording audio input. A more sensitive voice recognition system considers audio inputs that a less sensitive system would not, due to low audio level or quality.

As such, a sensitivity threshold is helpful in filtering out extraneous environmental noise. Noisy environments hinder voice recognition accuracy and efficiency because the background noise distorts the quality of an audible utterance. Thus, by adjusting the sensitivity threshold the voice recognition system can be tuned to ignore any user utterances or environment noise that do not meet system requirements.

Referring to FIGS. 6B and 6C, IGFR or OGFA type errors can occur if a voice recognition system is either too sensitive or not sensitive enough. For example, if the voice recognition system is highly sensitive, then even if the user is silent the voice recognition system accepts environmental noise as input. Because environmental noise cannot be meaningfully recognized by the voice recognition system, its acceptance as input can constitute an OGFA type error, in certain embodiments. If the voice recognition system is not sensitive enough, however, then it does not accept as input utterances that are provided at normal audio levels. Thus, a low sensitivity threshold results in IGFR type errors.

In accordance with one or more embodiments, the system analyzes the logged entries to determine if the sensitivity threshold is the source of an error. At step 740, for example, the system determines whether the recorded entries include a lot of noise. If so, the system at step 745 lowers the sensitivity threshold. If the voice recognition system is less sensitive, the user then needs to speak louder and more succinctly for a user utterance to be properly recognized. On the other hand, if at step 750, the system logs indicate that many user utterances are not properly recognized (e.g., IGFR type error due to insufficient system sensitivity), then the system at step 755 increases the voice recognition system's sensitivity, so that a user utterance is more readily accepted as input.

In addition to the sensitivity threshold, in some voice recognition systems, other thresholds such as timeout and end-of-speech thresholds are implemented to further refine recognition and reduce errors associated with noise. For example, in one or more embodiments, these thresholds are set to process audio inputs of limited lengths. Timeout and end-of-speech thresholds define the acceptable lengths of audio data for the voice recognition system. For example, the voice recognition system may process only audio inputs that are between two to ten seconds long. Any utterance that lasts less than two seconds or beyond ten seconds would not be processed for recognition.

Alternatively, the timeout threshold may be defined as the amount of time a user has following a prompt to begin a response. If the timeout threshold is too short, then a user has very little time to speak. This can contribute to user frustration as the voice recognition system stops listening to the user, if the user does not speak within the short timeout period allowed. On the other hand, if the timeout threshold is too long, then an excessive amount of noise may be included at the beginning of a user utterance.

The end-of-speech threshold could also alternatively be set so that the voice recognition system monitors a period of silence, after a user utterance, to determine if the user has completed his utterance. For example, in some embodiments, if 0.75 seconds of silence is detected, the voice recognition system will presume that the user has finished speaking. In this example, the end-of-speech threshold is 0.75 seconds. If end-of-speech or timeout thresholds are too long, a lot of noise can be added, respectively at the end or the beginning of a user utterance. This can result in an IGFR type error because the additional noise distorts the user utterance and therefore the likelihood of an acoustic match between the utterance and a term or phrase in the grammar's vocabulary decreases.

Referring to FIG. 7B, in one embodiment, the system analyzes the logged entries, at step 760, to determine if too many timeout errors have been recorded. A high number of timeouts indicate that the user has not had enough time to respond to interactive prompts. To remedy this situation, at step 765, the system increments the timeout threshold to provide a user with enough time to respond. The system may then periodically continue to monitor the timeout threshold and system logs to ensure that the setting is proper. The timeout threshold can be set in accordance with statistical data generated by transcription software 420, for example. This periodical screening of the threshold levels may be done on a daily or a weekly basis, for example.

For the stated reasons, additional noise (recorded at the beginning of a user utterance due to an improper timeout threshold, or at its end, due to an improper end-of-speech threshold) reduces recognition efficiency and accuracy. In some voice recognition systems, the environment noise level can be monitored or calculated based on a factor referred to as Signal to Noise Ratio (SNR). SNR indicates the level of noise detected in one or more user utterances received by the system. If a high SNR is detected then the system, at step 747, automatically adjusts the timeout and end-of-speech thresholds according to the principles discussed above to remedy the problem.

Perplexity

In embodiments of the system, entries in transcription log 430 include the length of time the voice recognition system took to recognize a user utterance. Delays in recognition can frustrate a user and indicate that the voice recognition system cannot efficiently search the recognition grammar's vocabulary to determine if a user utterance is included therein. The source of such type of error may be a recognition grammar that is too complex. That is, the recognition grammar has been implemented in a data structure format that requires the voice recognition system to perform many searches and comparisons before determining whether the user utterance is a part of the grammar. Perplexity can be thought of as the average branching factor in the data structure associated with the grammar's vocabulary.

The grammar's vocabulary is implemented and stored in a searchable data structure. To determine if a certain term is included in the grammar, the system, in some embodiments, searches several levels in the data structure. The various levels of the data structure are linked together to allow a user to move from one level to the next, for example.

Figures 8A, 8B:
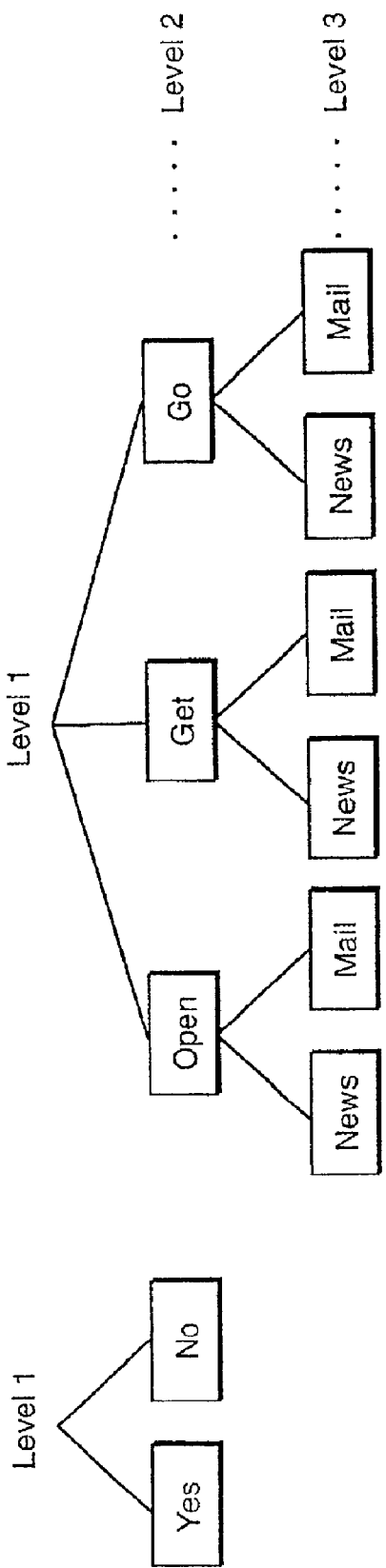
FIGS. 8A and 8B are block diagrams illustrating exemplifying data structures representing the different levels in a recognition grammar, in accordance with one or more embodiments.

Perplexity can be represented by the following formula:

$$P = 2 \text{ Gamma } 1 \, N \, P \log 2 \, (p)$$

where N is the total number of words in the test set, and p is the probability of the observed transition as calculated from the training data, which may correspond to the average number of branches at any decision point in a process. Speech researchers generally approximate perplexity according to vocabulary size; one rule of thumb is that the difficulty of a recognition task increases with the logarithm of the size of the vocabulary. The average branching factor is calculated by multiplying the number of options at each level and dividing the result by the number of decision levels. Referring to FIG. 8A, for example, if only "yes" and "no" are part of the voice recognition system's vocabulary the perplexity is 2, as there are only 2 options to choose from at a first level. Referring to FIG. 8B, in a grammar that includes, for example, "Open my mail," "Open my news," "Get my mail," "Get my news," "Go to mail," "Go to news," however the average branching factor of the data structure shown in FIG. 8B is equal to 3.

As shown, there are three options at the first level ("open my," "get my," and "go to") and 2 options at the second level ("news" or "mail"), thus a total of 6 options for the entire data structure. Since the grammar is 2 steps deep, we divide by 2 to get an average branching factor of 3.

If a grammar is too complex, then recognition is delayed, because processing multiple options at multiple decision levels is time and resource intensive. In some embodiments, the system monitors and records the access history of a user. The access history can be analyzed to determine links in the data structure that are most frequently used by a user to access certain content.

Referring back to FIG. 7B, at step 770, the system analyzes the logged entries to determine if recognition time is associated with long delays. If so, the system at step 775 attempts to reduce the perplexity of the data structure by eliminating infrequently used links in the data structure. For example, if there are 3 links to access the news, but the user access history indicates that only 2 of the 3 links are ever used, the system will reduce the grammar to just those 2 frequently used links.

Frequent Out-of-Grammar Utterances

Grammar developers invariably overlook certain words or phrases that a user may say in the natural course of spoken language in order to request the performance of a certain action. However, if a particular word is not included in the recognition grammar vocabulary, then it cannot be recognized, as discussed above. For example, a user is likely to say "play it" in order to listen to his or her voice messages. But, the recognition grammar may only recognize "read it" as a voice command that is associated with the request for playing user messages.

In one or more embodiments, the system analyzes the logged entries, at step 780, searching for frequent out-ofgrammar utterances. Frequent out-of-grammar utterances are those words or phrases, such as "play it," that can be frequently used as part of the spoken discourse but not included in recognition grammar. Once the system has determined a certain user utterance to be a frequent out-of-grammar utterance, then the system at step 765 modifies recognition grammar so that the user utterance can be recognized properly.

The recognition grammar can be modified to include the frequent out-of-grammar utterance or additional acoustic models so that the user utterance is recognized. Thus, for example, if the analysis of the system logs indicates that the user utterance "play it" has been received very frequently in an attempt to listen to voice messages, then the system adds "play it" to the recognition grammar as a voice command.

Embodiments of the invention are described by way of example as applicable to systems and corresponding methods for automatically improving voice recognition accuracy and efficiency. In this exemplifying embodiment, logic code for performing these methods is implemented in the form of, for example, application software 222. The logic code, in one embodiment, may be comprised of one or more modules that execute on one or more processors in a distributed or non-distributed communication model.

It should be understood that the order in which the steps of the present methods are performed is purely illustrative in nature. In fact, the steps can be performed in any order or in parallel, unless indicated otherwise by the present disclosure. The methods of the present invention may be performed in either hardware, software, or any combination thereof, as those terms are currently known in the art. In particular, the present method may be carried out by software, firmware, or macrocode operating on a computer or computers of any type. Additionally, software embodying the present invention may comprise computer instructions in any form (e.g., ROM, RAM, magnetic media, punched tape or card, compact disk (CD) in any form, DVD, etc.).

Furthermore, such software may also be in the form of a computer signal embodied in a carrier wave, such as that found within the well-known Web pages transferred among computers connected to the Internet. Accordingly, the present invention is not limited to any particular platform, unless specifically stated otherwise in the present disclosure.

Hardware & Software Environments

In accordance with one or more embodiments, the system is implemented in two environments, a software environment and a hardware environment. The hardware includes the machinery and equipment that provide an execution environment for the software. On the other hand, the software provides the execution instructions for the hardware.

The software can be divided into two major classes including system software and application software. System software includes control programs, such as the operating system (OS) and information management systems that instruct the hardware how to function and process information. Application software is a program that performs a specific task. As provided herein, in embodiments of the invention, system and application software are implemented and executed on one or more hardware environments.

Figure 9A:
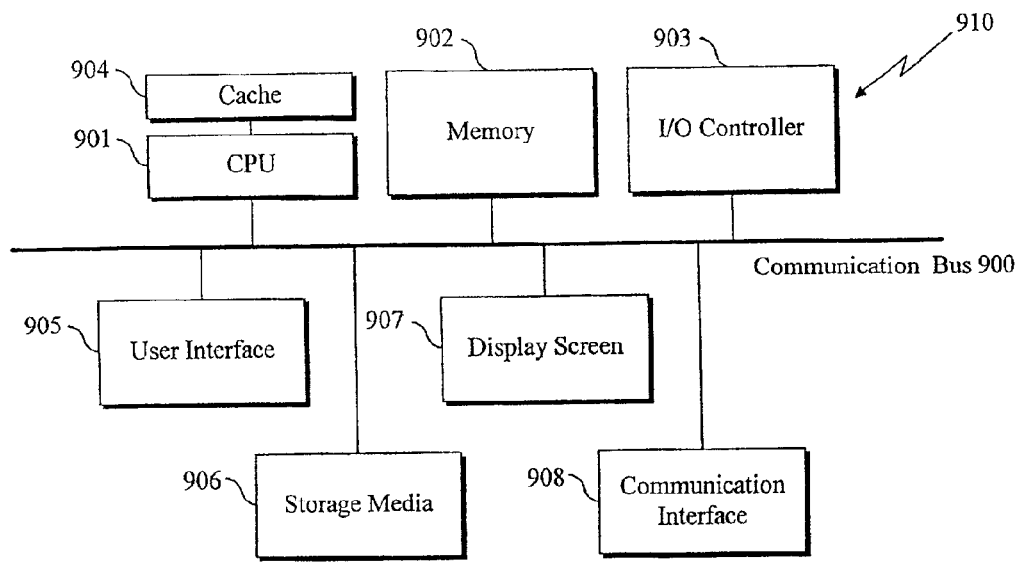
FIGS. 9A and 9B are block diagrams illustrating the hardware and software environments in which the system may operate, in accordance with one or more embodiments.
Figure 9B:
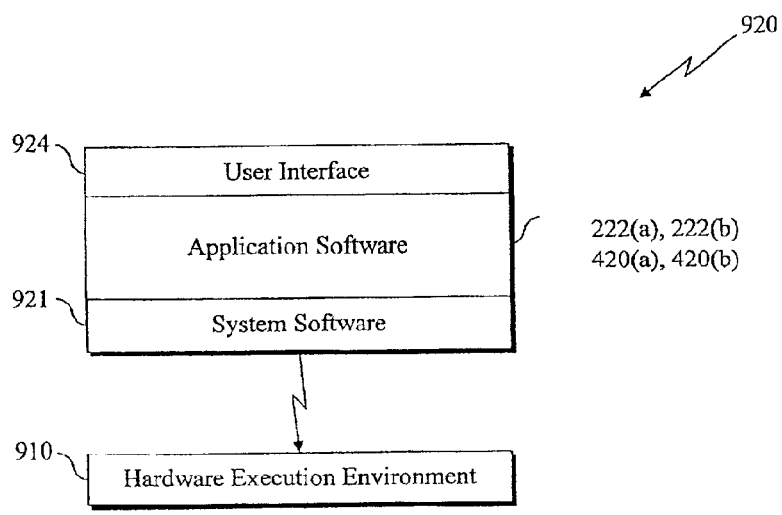

The invention may be practiced either individually or in combination with suitable hardware or software architectures or environments. For example, referring to FIG. 1, voice communication device 110, voice recognition gateway 100, communications server 120, and database server 130 may be implemented in association with computing system 910 (FIG. 9A). Application software 222 and transcription software 420 may be implemented in association with one or multiple modules as a part of software system 920 (FIG. 9B). It may prove advantageous to construct a specialized apparatus to execute said modules by way of dedicated computer systems with hard-wired logic code stored in non-volatile memory, such as, by way of example, read-only memory (ROM).

An embodiment of the system can include application software 222 and transcription software 420 in the form of computer readable code executed on a general purpose computing system 910. Computing system 910 includes a central processor unit (CPU) 901, a main memory 902, an input/output controller 903, optional cache memory 904, user interface devices 905 (e.g., keyboard, pointing device), storage media 906 (e.g., hard drive), a display screen 907, and a communication interface 908 (e.g., an integrated services digital network (ISDN) card). A communication bus 900 is utilized to connect the above system components. Computing system 910 may be capable of communicating with other systems through communication interface 908.

In one or more embodiments, computing system 910 may not include all the above components, or may include additional components for additional functionality or utility. For example, computing system 910 can be a laptop computer or other portable computing device that can send messages and receive data through communication interface 908. Computing system 910 may be partially or fully embodied in an embedded system such as a set-top box, a personal data assistant (PDA), a wireless communication unit (e.g., cellular phone), web televisions, or other similar hardware platforms that have information processing and/or data storage capabilities.

Communication interface 908 can send and receive electrical, electromagnetic, or optical signals that carry digital data streams representing various types of information including logic code. The logic code can be executed by central processor unit 901 or is stored in storage media 906 or other non-volatile storage for later execution. Logic code may be transmitted via a carrier wave or may be embodied in any other form of computer program product. In one or more embodiments, processor 901 is a microprocessor manufactured by Motorola,® Intel,® or Sun Microsystems® Corporations. The named processors are for the purpose of example only. Any other suitable microprocessor, microcontroller, or microcomputer may be utilized.

FIG. 9B illustrates exemplifying computer software 920 suited for managing and directing the operation of the hardware environment described above. Computer software 920 is, typically, stored in storage media 906 and is loaded into memory 902 prior to execution. Computer software 920 may comprise system software 921 and application software 222. System software 921 includes control software such as an operating system that controls the low-level operations of computing system 910. In one or more embodiments of the invention, the operating system is Microsoft Windows 2000,® Microsoft Windows NT,® Macintosh OS,® UNIX,® LINUX,® or any other suitable operating system may be utilized.

Application software 222 and transcription software 420 can include one or more computer programs that are executed on top of system software 921 after being loaded from storage media 906 into memory 902. In a client-server architecture, application software 222 and transcription software 420 may include client software 222(*a*) and 420(*a*) and/or a server software 222(*b*) and 420(*b*). Referring to FIG. 1 for example, in one embodiment of the invention, client software 222(*a*) is executed on voice communication device 110 and server software 222(*b*) is executed on voice recognition gateway 100. Further, computer software 920 includes a user interface 924 for receiving user commands and delivering content to a user.

Thus, methods and systems for automatically improving a voice recognition system are provided. The embodiments described above are to be considered in all aspects as illustrative only and not restrictive in any manner. Thus, other exemplifying embodiments, system architectures, platforms, and implementations that can support various aspects of the invention may be utilized without departing from the essential characteristics described herein. These and various other adaptations and combinations of features of the embodiments disclosed are within the scope of the invention. The invention is defined by the claims and their full scope of equivalents.

APPENDIX A

The following is an exemplifying list that reflects the recognition accuracy level of the system at various confidence thresholds

| CONFIDENCE THRESHOLD | CORRECT | INCORRECT | REJECT |
|---|---|---|---|
| 0 | 92.71% | 7.29% | 0.00% |
| 1 | 86.17% | 6.45% | 7.38% |
| 2 | 86.17% | 6.45% | 7.38% |
| 3 | 86.17% | 6.45% | 7.38% |
| 4 | 86.17% | 6.43% | 7.40% |
| 5 | 86.17% | 6.43% | 7.40% |
| 6 | 86.17% | 6.43% | 7.40% |
| 7 | 86.13% | 6.43% | 7.44% |
| 8 | 86.09% | 6.43% | 7.48% |
| 9 | 86.09% | 6.43% | 7.48% |
| 10 | 86.07% | 6.43% | 7.50% |
| 11 | 86.07% | 6.43% | 7.50% |
| 12 | 86.00% | 6.43% | 7.58% |
| 13 | 85.98% | 6.43% | 7.60% |
| 14 | 85.82% | 6.43% | 7.75% |
| 15 | 85.80% | 6.41% | 7.79% |
| 16 | 85.63% | 6.41% | 7.96% |
| 17 | 85.57% | 6.37% | 8.05% |
| 18 | 85.46% | 6.37% | 8.17% |
| 19 | 85.19% | 6.35% | 8.46% |
| 20 | 84.98% | 6.33% | 8.69% |
| 21 | 84.69% | 6.31% | 8.99% |
| 22 | 84.16% | 6.28% | 9.57% |
| 23 | 83.74% | 6.26% | 10.01% |
| 24 | 83.34% | 6.20% | 10.46% |
| 25 | 82.69% | 6.10% | 11.21% |
| 26 | 82.13% | 5.93% | 11.94% |
| 27 | 81.63% | 5.82% | 12.55% |
| 28 | 80.98% | 5.62% | 13.39% |
| 29 | 80.29% | 5.49% | 14.21% |
| 30 | 79.63% | 5.26% | 15.11% |
| 31 | 78.65% | 5.15% | 16.20% |
| 32 | 77.65% | 4.96% | 17.39% |
| 33 | 76.54% | 4.69% | 18.77% |
| 34 | 75.30% | 4.50% | 20.20% |
| 35 | 73.96% | 4.42% | 21.62% |
| 36 | 72.89% | 4.23% | 22.88% |
| 37 | 71.57% | 4.00% | 24.43% |
| 38 | 70.15% | 3.79% | 26.06% |
| 39 | 68.62% | 3.58% | 27.80% |
| 40 | 66.92% | 3.37% | 29.71% |
| 41 | 65.39% | 3.14% | 31.47% |
| 42 | 63.82% | 2.81% | 33.37% |
| 43 | 62.37% | 2.66% | 34.97% |
| 44 | 60.72% | 2.53% | 36.75% |
| 45 | 58.83% | 2.37% | 38.80% |
| 46 | 57.41% | 2.12% | 40.46% |
| 47 | 55.46% | 2.01% | 42.53% |
| 48 | 53.95% | 1.76% | 44.29% |
| 49 | 52.08% | 1.59% | 46.34% |
| 50 | 50.45% | 1.42% | 48.13% |

APPENDIX B

The following is an exemplifying list that illustrates the rate of correctly rejected utterances in accordance to one embodiment of the system

| CONFIDENCE THRESHOLD | CORRECT REJECT |
|---|---|
| 0 | 0% |
| 1 | 7% |
| 2 | 12% |
| 3 | 16% |
| 4 | 19% |
| 5 | 22% |
| 6 | 24% |
| 7 | 26% |
| 8 | 28% |
| 9 | 29% |
| 10 | 30% |
| 11 | 31% |
| 12 | 32% |
| 13 | 33% |
| 14 | 34% |
| 15 | 35% |
| 16 | 36% |
| 17 | 37% |
| 18 | 38% |
| 19 | 39% |
| 20 | 40% |
| 21 | 41% |
| 22 | 42% |
| 23 | 43% |
| 24 | 44% |
| 25 | 45% |
| 26 | 46% |
| 27 | 47% |
| 28 | 48% |
| 29 | 49% |
| 30 | 50% |
| 31 | 50% |
| 32 | 50% |
| 33 | 51% |
| 34 | 51% |
| 35 | 51% |
| 36 | 51% |
| 37 | 51% |
| 38 | 51% |
| 39 | 52% |
| 40 | 52% |
| 41 | 52% |
| 42 | 52% |
| 43 | 52% |
| 44 | 52% |
| 45 | 53% |
| 46 | 53% |
| 47 | 53% |
| 48 | 53% |
| 49 | 53% |
| 50 | 53% |

What is claimed is:

1. An automated method of monitoring recognition accuracy in a voice recognition system comprising:
   retrieving voice recognition information produced by a voice recognition system in response to recognizing a user utterance, the voice recognition information comprising a recognized voice command associated with the user utterance and a reference to an audio file that includes the user utterance;
   playing the audio file;
   determining if the recognized voice command matches the user utterance included in the audio file;
   transcribing the user utterance to create a transcribed utterance, if the recognized voice command does not match the user utterance; and
   recording the transcribed utterance in association with the recognized voice command to monitor recognition accuracy of the voice recognition system.

2. The method of claim 1, wherein the voice recognition information further comprises information for a recognition grammar used to recognize the user utterance.

3. The method of claim 1, wherein the voice recognition information further comprises a confidence threshold associated with the recognized voice command.

4. The method of claim 1, wherein the voice recognition information further comprises a recognition delay associated with the recognized voice command.

5. The method of claim 1, wherein the transcribed utterance is recorded in a transcription log in association with the recognized voice command and the corresponding voice recognition information.

6. The method of claim 5, wherein the voice recognition information includes the audio file that includes the user utterance.

7. The method of claim 5, further comprising:
analyzing information recorded in the transcription log to detect a type of recognition error.

8. The method of claim 7, further comprising:
determining a source of the detected recognition error based on the type of recognition error.

9. The method of claim 8, further comprising:
hypothesizing a solution to eliminate the source of error.

10. The method of claim 5, further comprising:
determining recognition accuracy based on the information recorded in the transcription log.

11. A system for monitoring recognition accuracy of a voice recognition system having at least one recognition grammar comprising:
software for retrieving voice recognition information stored in a call log by a voice recognition system in response to recognizing a user utterance, the voice recognition information comprising a recognized voice command associated with the user utterance and a reference to an audio file that includes the user utterance;
a transcription log produced by the software, the transcription log comprising an entry associated with the user utterance, the entry comprising:
the recognized voice command; and
a transcribed utterance produced from transcribing the user utterance, if the user utterance included in the audio file does not match the recognized voice command associated with it;
wherein the software determines a recognition accuracy for the voice recognition system by analyzing the entry recorded in the transcription log.

12. The system of claim 11, wherein the voice recognition information further comprises information for a recognition grammar used to recognize the user utterance.

13. The system of claim 11, wherein the voice recognition information further comprises a confidence threshold associated with the recognized voice command.

14. The system of claim 11, wherein the voice recognition information further comprises:
a recognition delay associated with the recognized voice command.

15. The system of claim 11, wherein the transcribed utterance is compared with the recognized voice command to determine if an error in recognition has occurred.

16. The system of claim 15, wherein the software records in an error log a type of recognition error associated with a recognized user utterance, if the transcribed utterance does not match the recognized voice command.

17. The system of claim 16, wherein the software records an in-grammar false reject (IGFR) type error, if the transcribed utterance is part of the recognition grammar but the user utterance is not recognized by the voice recognition system as part of the recognition grammar.

18. The system of claim 16, wherein the software records an in-grammar false accept (IGFA) type error, if the transcribed utterance is part of the recognition grammar and the recognized voice command does not match the transcribed utterance.

19. The system of claim 16, wherein the software records an out-of-grammar false accept (OGFA) type error, if the transcribed utterance is not part of the recognition grammar but the user utterance is mistakenly recognized by the voice recognition system as the recognized voice command.

20. The system of claim 16, wherein the software records an out-of-grammar correct reject (OGCR) type error if the transcribed utterance is not part of the recognition grammar but the transcribed utterance is frequently recorded in the transcription log.

21. The system of claim 18, wherein:
a source of error is determined to be a low confidence threshold, if an IGFA type error is detected.

22. The system of claim 18, wherein:
a source of error is determined to be acoustic similarity between the recognized voice command and the user utterance, if an IGFA type error is detected.

23. The system of claim 18, wherein the recognition grammar includes one or more acoustic models for the recognized voice command, wherein:
a source of error is determined to be lack of sufficient acoustic models in the recognition grammar, if an IGFA type error is detected.

24. The system of claim 17, wherein a source of error is determined to be a high confidence threshold, if an IGFR type error is detected.

25. The system of claim 17, wherein the recognition grammar includes one or more acoustic models for the recognized voice command, wherein:
a source of error is determined to be lack of sufficient acoustic models in the recognition grammar, if an IGFR type error is detected.

26. The system of claim 17, wherein the voice recognition system is configured with a first recognition sensitivity threshold, wherein:
a source of error is determined to be a low sensitivity threshold, if an IGFR type error is detected.

27. The system of claim 19, wherein:
a source of error is determined to be acoustic similarity between the recognized voice command and the user utterance, if an OGFA type error is detected.

28. The system of claim 19, wherein the voice recognition system is configured with a first recognition sensitivity threshold, wherein:
a source of error is determined to be a high sensitivity threshold, if an OGFA type error is detected.

29. The system of claim 19, wherein a source of error is determined to be a low confidence threshold, if an OGFA type error is detected.

30. The system of claim 20, wherein the recognition grammar includes one or more acoustic models for the recognized voice command, wherein:
a source of error is determined to be lack of sufficient acoustic models in the recognition grammar, if an OGCR type error is detected.

31. A method for automatically improving a voice recognition system comprising:
determining voice recognition accuracy by analyzing voice recognition information produced by a voice recognition system in response to receiving a user utterance, the voice recognition system comprising a recognition grammar and a first configuration, the voice recognition information comprising a recognized voice command associated with the user utterance;

detecting a recognition error, if the recognized voice command does not match a transcribed utterance for the user utterance;

determining at least one source of error for the detected recognition error;

hypothesizing at least one solution to eliminate the source of error; and modifying the first configuration based on the hypothesized solution to implement a second configuration for the voice recognition system with better recognition accuracy.

32. The method of claim 31, further comprising:

testing the voice recognition system to detect improvements in voice recognition accuracy; and restoring the first configuration, if voice recognition accuracy is not improved.

33. The method of claim 32, wherein the voice recognition information further comprises information for a recognition grammar used to recognize the user utterance.

34. The method of claim 33, wherein the voice recognition information further comprises a confidence threshold associated with the recognized voice command.

35. The method of claim 34, wherein the voice recognition information further comprises a recognition delay associated with the recognized voice command.

36. The method of claim 35, wherein an in-grammar false accept (IGFA) type error is detected, if the transcribed utterance is part of the recognition grammar and the recognized voice command does not match the transcribed utterance.

37. The method of claim 35, wherein an in-grammar false reject (IGFR) type error is detected, if the transcribed utterance is part of the recognition grammar but the user utterance is not recognized by the voice recognition system as part of the recognition grammar.

38. The method of claim 35, wherein an out-of-grammar false accept (OGFA) type error is detected, if the transcribed utterance is not part of the recognition grammar but the user utterance is mistakenly recognized by the voice recognition system as the recognized voice command.

39. The method of claim 35, wherein an out-of-grammar correct reject (OGCR) type error is detected, if the transcribed utterance is not part of the recognition grammar but the transcribed utterance is frequently recorded.

40. The method of claim 36, wherein a source of error is determined to be a low confidence threshold, if an IGFA type error is detected.

41. The method of claim 36, wherein a source of error is determined to be acoustic similarity between the recognized voice command and the user utterance, if an IGFA type error is detected.

42. The method of claim 36, wherein the recognition grammar includes one or more acoustic models for the recognized voice command, wherein a source of error is determined to be lack of sufficient acoustic models in the recognition grammar, if an IGFA type error is detected.

43. The method of claim 37, wherein a source of error is determined to be a high confidence threshold, if an IGFR type error is detected.

44. The method of claim 37, wherein the recognition grammar includes one or more acoustic models for the recognized voice command, wherein a source of error is determined to be lack of sufficient acoustic models in the recognition grammar, if an IGFR type error is detected.

45. The method of claim 37, wherein the voice recognition system is configured with a first recognition sensitivity threshold, wherein a source of error is determined to be a low sensitivity threshold, if an IGFR type error is detected.

46. The method of claim 38, wherein a source of error is determined to be acoustic similarity between the recognized voice command and the user utterance, if an OGFA type error is detected.

47. The method of claim 38, wherein the voice recognition system is configured with a first recognition sensitivity threshold, wherein a source of error is determined to be a high sensitivity threshold, if an OGFA type error is detected.

48. The method of claim 38, wherein a source of error is determined to be a low confidence threshold, if an OGFA type error is detected.

49. The method of claim 39, wherein the recognition grammar includes one or more acoustic models for the recognized voice command, wherein a source of error is determined to be lack of sufficient acoustic models in the recognition grammar, if an OGCR type error is detected.

50. A method of improving recognition accuracy and efficiency in a voice recognition system having a grammar, wherein a received utterance is accepted if the utterance is an acoustic match with at least one term included in the grammar and rejected otherwise, the method comprising:

determining if the utterance has been falsely accepted by the voice recognition system; and removing a term from the grammar, if the utterance is part of the grammar but is falsely accepted as another term included in the grammar due to acoustic similarity.

51. The method of claim 50, further comprising:

adding to the grammar one or more synonyms which are acoustically dissimilar to the utterance if it has been falsely accepted.

52. The method of claim 50, wherein the voice recognition system comprises at least one acoustic model for the utterance, the method further comprising:

adding to the voice recognition system an additional acoustic model for the utterance, if the utterance is part of the grammar, but is falsely rejected due to lack of sufficient alternative acoustic models.

53. The method of claim 52, wherein the additional acoustic model is one that is associated with the rejected utterance.

54. The method of claim 50, wherein the voice recognition system has a confidence threshold for adjusting recognition accuracy based on degree of acoustic similarity between the utterance and one or more acoustic models included in the voice recognition system, wherein the recognition accuracy is improved if the confidence threshold is higher, the method further comprising:

lowering the confidence threshold, if the utterance is part of the grammar, but is falsely rejected due to a high confidence threshold.

55. The method of claim 50, wherein the voice recognition system has a sensitivity threshold for accepting utterances, wherein a higher sensitivity allows for a larger number of utterances to be considered by the voice recognition system, the method further comprising:

lowering the sensitivity threshold if a predetermined amount of noise is undesirably considered by the voice recognition system.

56. The method of claim 55, further comprising:

increasing the sensitivity threshold, if the utterance is part of the grammar, but is falsely rejected due to a low sensitivity threshold.

57. The method of claim 50, wherein the voice recognition system has a timeout threshold and an end-of-speech threshold for accepting an utterance having a certain audio length or audio delay, the method further comprising:

adjusting the timeout and the end-of-speech thresholds, if a predetermined amount of noise is undesirably considered for acceptance by the system.

58. The method of claim 50, wherein the grammar has a perplexity associated with a number of decision levels and terms included in the grammar, the method further comprising:

reducing grammar perplexity, if recognition of the utterance is delayed beyond a threshold value.

59. The method of claim 50, further comprising:

monitoring frequently received utterances that are rejected because they are not part of the grammar; and adding the frequently received utterances to the grammar.

60. A method performed on a computer for monitoring recognition accuracy in a voice recognition system comprising:

recording a user utterance in an audio file;

storing a voice command which was recognized by the voice recognition system for the user utterance;

presenting the audio file and the voice command to an operator for selection;

playing the user utterance from the audio file for the operator upon selection by the operator;

receiving a transcription of the user utterance; and associating the transcription with the recognized voice command.

\* \* \* \* \*

UNITED STATES PATENT AND TRADEMARK OFFICE
CERTIFICATE OF CORRECTION

| | | |
|---|---|---|
| PATENT NO. | : 7,103,542 B2 | |
| APPLICATION NO. | : 10/023914 | |
| DATED | : September 5, 2006 | |
| INVENTOR(S) | : Sean Doyle | |

Figure 2A:
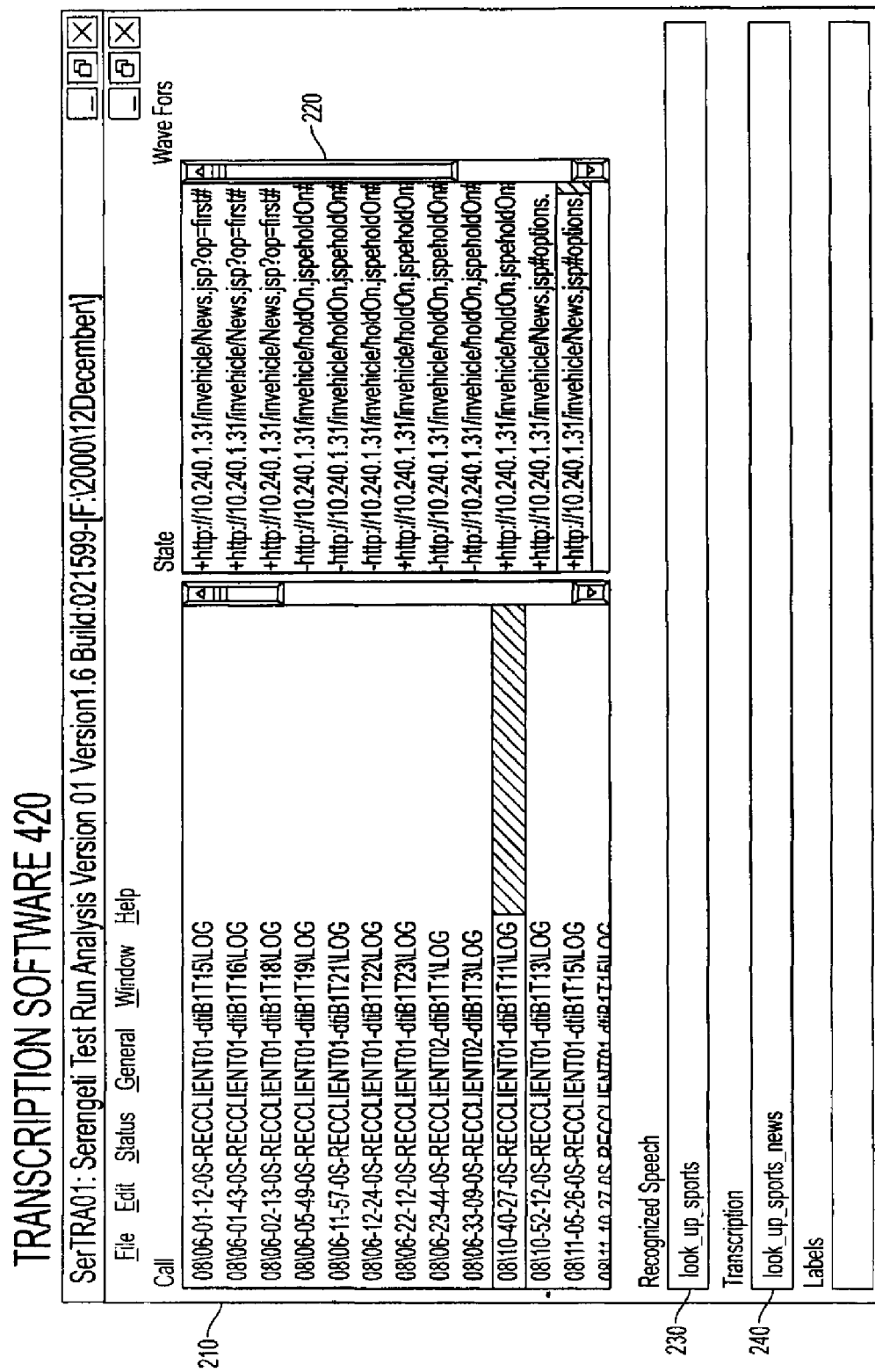

It is certified that error appears in the above-identified patent and that said Letters Patent is hereby corrected as shown below:

In the Drawing Sheet 2 of 11, showing Figure 2 has been REPLACED with Replacement Drawing Figure 2A, and Fig. 2B. Please show the new illustrated drawing 2A and 2B and is attached hereto.

Signed and Sealed this

Thirtieth Day of June, 2009

JOHN DOLL
*Acting Director of the United States Patent and Trademark Office*

Annotations

Interpretation of Recognized Speech, using Grammar | News |

<dynamic dynamic> <namespace SPORTS_GET>

Reinterpretation of Recognized Speech

Interpretation of Transcription

Log Text

| BARGE_IN | : FALSE |
| BEGIN_TIME | : 399.844 |
| CONFIDENCE[0] | : .70 |
| GRAMMAR | : NEWS |
| NL_INTERPRETATION[0][0] | : <dynamic dynamic> <namespace SPORTS_GET> |
| NUM_NL_INTERPRETATIONS[0] | : 1 |
| NUM_RESULTS | : 1 |
| RECOGNITION_DELAY | : 0.755 |
| RESULT[0] | : look_up_sports |
| STATE | : http://10.240.1.31/invehicle/News.jsp#options:_initial16094 |
| STATE_DURATION | : 11.156 |
| TIME | : Fri Dec 08 10 47:07 2000 |
| TRANSCRIPTION | : look_up_sports_news |
| UTTERANCE_FILENAME | : d:\genericlogs\2000\12December08\10-40-27-OS-RECCLIENT01-dtlBtT11/utt37.wav |

Call 9 State 47

FIG. 2B